US 7,027,378 B2

(12) United States Patent
Komma et al.

(10) Patent No.: US 7,027,378 B2
(45) Date of Patent: *Apr. 11, 2006

(54) OPTICAL DISK DEVICE AND INFORMATION RECORDING/REPRODUCING METHOD

(75) Inventors: Yoshiaki Komma, Hirakata (JP); Hidenori Wada, Uji (JP); Seiji Nishino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/894,907

(22) Filed: Jul. 20, 2004

(65) Prior Publication Data

US 2004/0264312 A1    Dec. 30, 2004

Related U.S. Application Data

(62) Division of application No. 09/946,645, filed on Sep. 4, 2001, now Pat. No. 6,954,417.

(30) Foreign Application Priority Data

Sep. 6, 2000    (JP)    ............................. 2000-269805

(51) Int. Cl.
 *G11B 7/00*    (2006.01)
(52) U.S. Cl. ............................. 369/112.01; 369/112.02
(58) Field of Classification Search ............ 369/112.1, 369/112.01, 112.02, 94, 112.22, 44.23, 44.24
See application file for complete search history.

(56) References Cited

U.S. PATENT DOCUMENTS 6,052,237 A    4/2000    Opheij et al.

FOREIGN PATENT DOCUMENTS

| CN | 1181833 | 5/1998 |
|---|---|---|
| EP | 1 043 615 | 10/2000 |
| JP | 9-115146 | 5/1997 |
| JP | 10-143873 | 5/1998 |
| JP | 11-191222 | 7/1999 |
| JP | 11-316954 | 11/1999 |
| JP | 2000-131603 | 5/2000 |

*Primary Examiner*—Nabil Hindi
(74) *Attorney, Agent, or Firm*—Hamre, Schumann, Mueller & Larson, P.C.

(57) ABSTRACT

An optical disk device is provided with an optical pickup that includes a convergent optical system having an objective lens for converging a light beam emitted from the laser light source to form a microspot on an optical disk and an aberration correcting optical system for controlling a spherical aberration of the convergent optical system, and performs information recording or reproduction with respect to a multi-layer optical disk having at least a first recording layer and a second recording layer. In the optical disk device, an operation of changing a correction quantity of the spherical aberration from a value adequate for the first recording layer to a predetermined value is started before an operation of moving a focus position of the microspot from the first layer to the second layer is completed. This allows a focus control to be performed stably with respect to the second recording layer in a state in which the spherical aberration correction already has been carried out, thereby preventing the focus control from failing due to an unsuccessful interlayer jump.

13 Claims, 19 Drawing Sheets

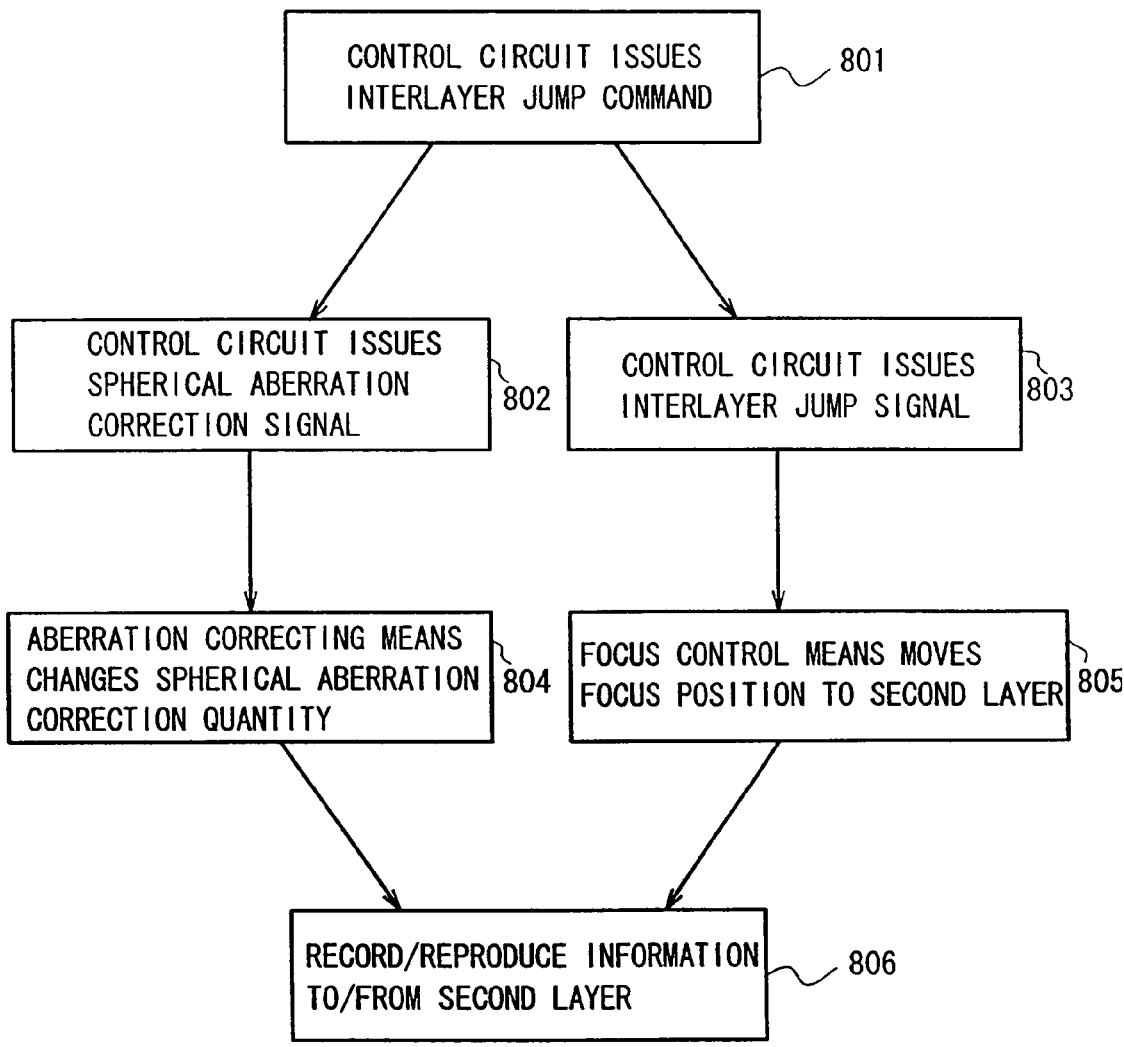
F I G. 1

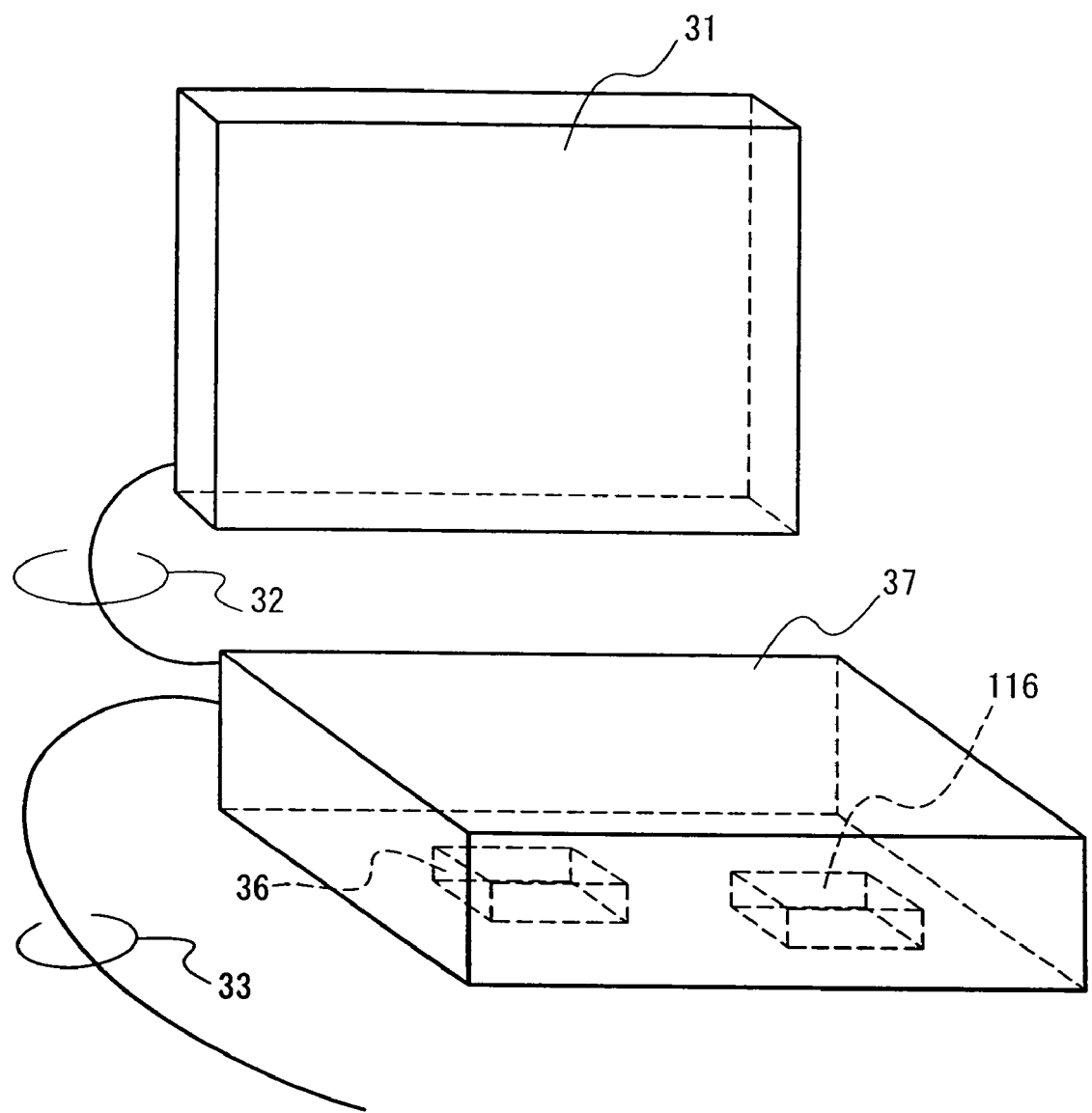
F I G. 11

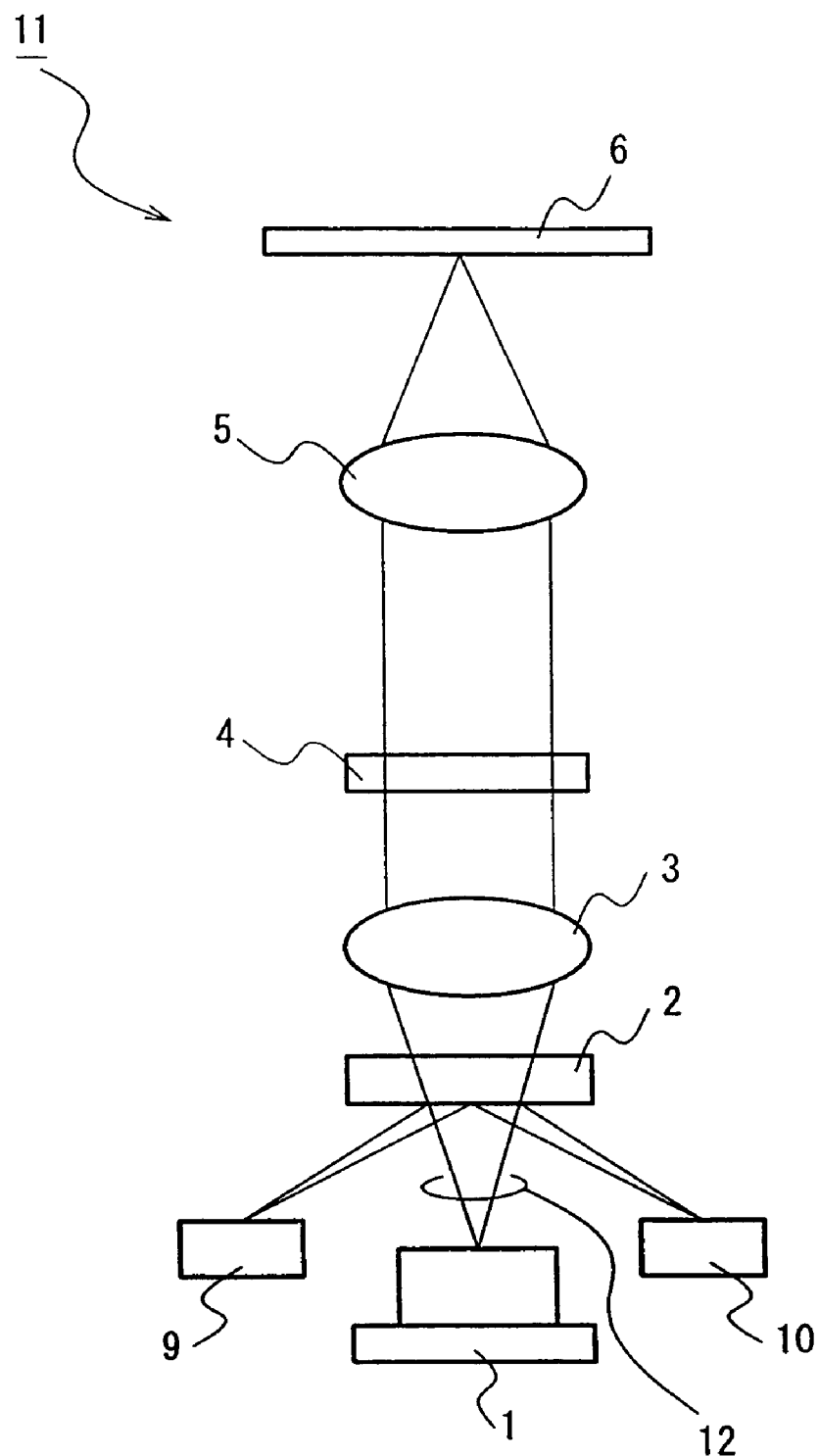
F I G. 14

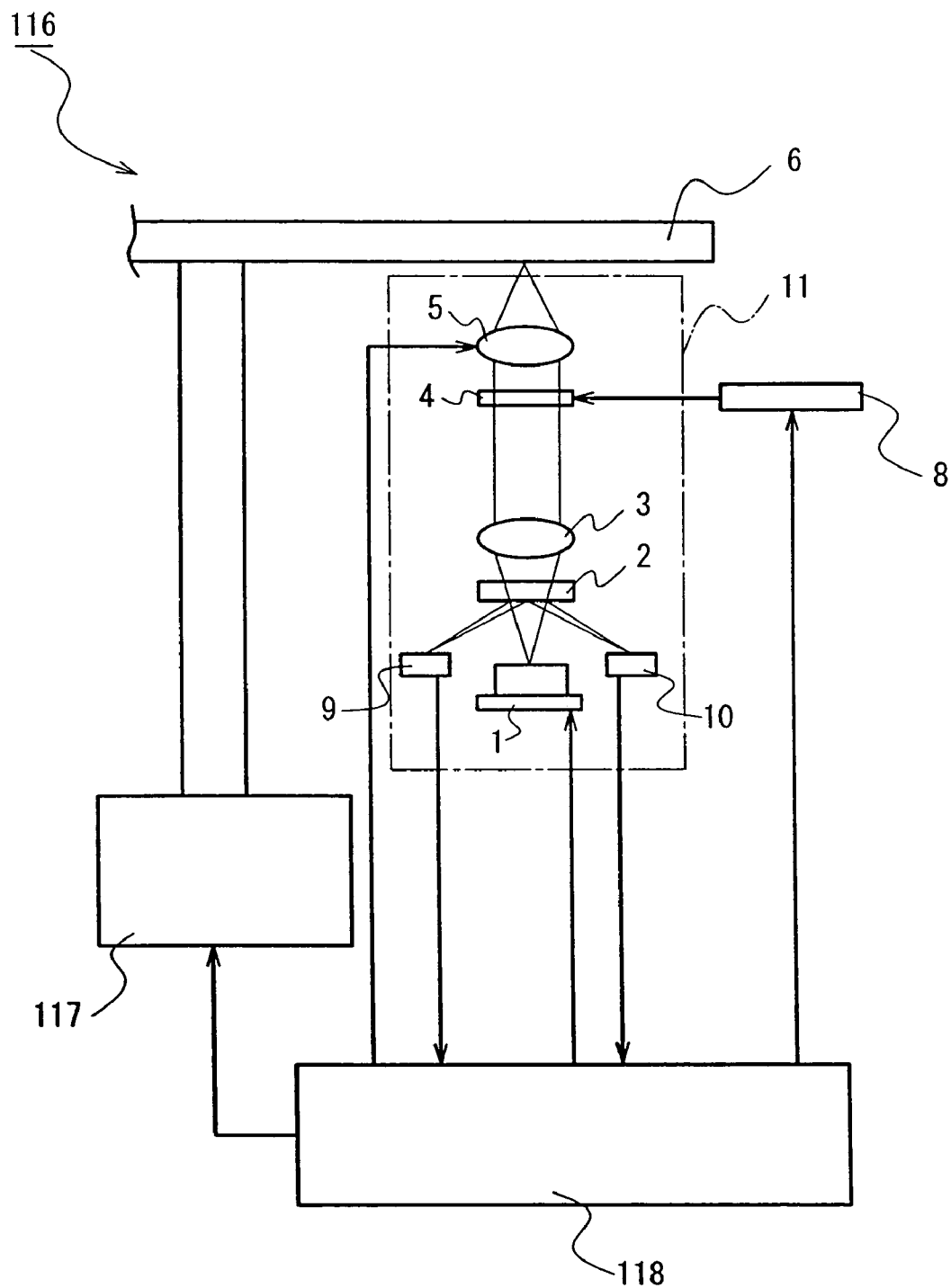
F I G. 15

OPTICAL DISK DEVICE AND INFORMATION RECORDING/REPRODUCING METHOD

This application is a divisional of application Ser. No. 09/946,645, filed Sep. 4, 2001 now U.S. Pat. No. 6,954,417, which application is incorporated herein by reference.

BACKGROUND OF THE INVENTION

1. Field of the Invention

The present invention relates generally to an optical information device (hereinafter referred to as "optical disk device") provided with an optical pickup for recording, reproducing, or erasing information on an optical disk as an optical information medium, and to a recording/reproducing method for recording, reproducing, or erasing information on the optical disk. Herein, the "recording/reproducing" refers to an apparatus or methoc capable of carrying out one or both functions for the purposes of the present invention. Besides, the present invention also relates to various systems in which the foregoing optical disk device is utilized.

2. Related Background Art

An optical memory technology in which an optical disk having pit-like patterns is used as a high-density, large-capacity memory medium has been put to practical use while the technology has been applied in an increasingly wide range of fields including digital audio disks, video disks, document file disks, and data files. Functions required for carrying out the recording and reproduction of information to and from an optical disk with high reliability are classified roughly into a light collecting function for forming a microspot at a diffraction limit, focus control (focus servo) and tracking control functions of an optical system, and a pit signal (information signal) detecting function.

Recently, a technique of increasing a numerical aperture (NA) of an objective lens that forms a microspot at a diffraction limit on an optical disk by converging an optical beam has been examined with a view to obtaining an even higher recording density of an optical disk. However, a spherical aberration stemming from an error of a thickness of a substrate that protects a recording layer of the optical disk is proportional to the NA raised to the fourth power. Therefore, in the case where the NA is set to be great, for instance, 0.8 or 0.85, it is indispensable to provide a means for correcting a spherical aberration in an optical system. An example of the same is shown in FIG. 14.

In a pickup 11 shown in FIG. 14, 1 denotes a laser light source as a radiation source. A light beam (laser beam) emitted from the laser light source 1 is converted into parallel light by a collimator lens 3, passes through a liquid crystal aberration correcting element (aberration correcting optical system) 4, enters the objective lens 5, and is converged and directed to an optical disk 6. The light beam reflected by the optical disk 6 goes backwards along the foregoing optical path, and is converged by the collimator lens 3. Then, the light is guided by a light dividing means such as a diffracting element 2 toward photodetectors 9 and 10, and is incident thereto. By calculating electric outputs according to respective quantities of light incident on the photodetectors 9 and 10, servo signals (focus error signal and tracking error signal) and an information signal can be obtained. Here, the NA of the objective lens 5 is at least 0.8.

Though not shown, the objective lens 5 is provided with a driving means such as a coil and a magnet, for the focus control for controlling a position of the objective lens in the optical axis direction and the tracking control for controlling a position of the objective lens in a direction perpendicular to the optical axis direction. Besides, though not shown in the figures, either, a transparent substrate is provided over an objective-lens-5-side surface of an information recording layer of the optical disk 6, so that information is protected. Since errors in the thickness and the refractive index of the transparent substrate lead to spherical aberrations, the liquid crystal aberration correcting element 4 corrects a wavefront of the light beam so that reproduction signals are obtained in the optimal state. On the liquid crystal aberration element 4, patterns of transparent electrodes such as ITO are formed, and by applying voltages to the transparent electrodes, the in-plane refractive index distribution of the liquid crystal aberration correcting element 4 is controlled so that the wavefront of the light beam is modulated.

An optical disk device 116 in which such an optical pickup 11 as above is used is shown in FIG. 15. In FIG. 15, 8 denotes an aberration correcting element driving circuit for applying a voltage to the liquid crystal aberration correcting element 4, 117 denotes a motor for rotating an optical disk 6, and 118 denotes a control circuit for receiving signals obtained from the optical pickup 11 and controlling and driving the motor 117, the objective lens 5, the aberration correcting element driving circuit 8, and the laser light source 1. The control circuit 118 causes the laser light source 1 to emit light, drives the motor 117 so as to rotate the optical disk 6, and controls the objective lens 5 according to signals obtained from the optical pickup 11. Furthermore, the control circuit 118 drives the aberration correcting element driving circuit 8 so as to improve information signals obtained from the optical pickup 11.

An optical system used as the optical pickup 11 in the optical disk device 116 is not limited to the optical system shown in FIG. 14, but may be an optical system disclosed by JP 2000-131603A, which is shown in FIG. 16.

In FIG. 16, a laser light source, a collimator lens, and photodetectors of the optical system as the optical pickup are omitted. These may be configured in the same manner as in the optical system shown in FIG. 14. A light beam converted into a parallel light by a collimator lens, not shown, passes through an aberration correcting lens group 201 composed of a negative lens group 21 and a positive lens group 22, and is converged and directed to the optical disk 6 by an objective lens group 202 composed of a pair of a first objective lens 23 and a second objective lens 24. By changing a distance between the negative lens group 21 and the positive lens group 22 of the aberration correcting lens group 201, the spherical aberration of the optical system as a whole is corrected. To change the distance between the negative lens group 21 and the positive lens group 22, for instance, the lens groups may be provided with a driving means 25 and a driving means 26 for moving the same, respectively. Each of the driving means 25 and 26 may be formed with a voice coil, a piezoelectric element, an ultrasonic motor, or a screw feeder.

In the foregoing configuration, normally, the spherical aberration correction is carried out so as to improve the quality of the information signals on the premise that the focus control stably functions on a single information recording surface of the optical disk 6.

However, according to the DVD standard with an objective lens having an NA of 0.6, a two-layer disk having two information recording surfaces also is adaptable. Therefore, with an NA set to be greater, likewise the two-layer disk structure is effective so as to further increase the memory capacity per one optical disk. A two-layer disk 61 is composed of a substrate 62, an L0 layer (first recording layer) 63, an intermediate layer 65, an L1 layer (second recording layer) 64, and a protective layer 66 on a reverse side, which are laminated in the stated order from the optical pickup 60 side, as shown in FIG. 17. The substrate 62 and the intermediate layer 65 are made of a transparent medium such as a resin. Since the intermediate layer 65 is provided between the L0 layer 63 and the L1 layer 64, a thickness from the-optical-pickup-60-side surface of the optical disk 61 to the L1 layer 64 is greater than a thickness therefrom to the L0 layer 63 by the thickness of the intermediate layer 65. This thickness difference generates a spherical aberration. In the case of an optical system according to the DVD standard in which the objective lens has an NA of 0.6, however, the foregoing spherical aberration is within a tolerance, thereby making it possible to record/reproduce information without aberration correction.

In the case where an objective lens with a great NA of not less than 0.8 is used so as to further increase the recording density, a spherical aberration due to the thickness of the intermediate layer 65 cannot be ignored. In other words, it is impossible to record/reproduce information with respect to both recording layers with a common optical pickup without correcting a spherical aberration. In the case where the NA is increased to not less than 0.8, as described above, a spherical aberration correcting means is provided even in the case where information recording/reproduction is carried out with respect to a single recording layer. Therefore, in the case where the recording/reproduction is carried out with respect to the two-layer disk as shown in FIG. 17, the spherical aberration due to the thickness of the intermediate layer 65 is cancelled by optimally carrying out the spherical aberration correction with respect to each recording layer.

To the two-layer disk as shown in FIG. 17, a position at which a light beam is converged thereby forming a microspot (hereinafter referred to as focus position) occasionally is moved: for instance, from the L0 layer 63 to the L1 layer 64 while information is being recorded/reproduced to/from the L0 layer with the light beam converged onto the L0 layer 63, so that information is recorded/reproduced to/from the L1 layer 64; or to the contrary, from the L1 layer 64 to the L0 layer 63. (Such an operation of moving the focus position to another recording layer is hereinafter referred to as "interlayer jump".) JP 9(1997)-115146A, JP10(1998)-143873A, JP11(1999)-191222A and JP11(1999)-316954A disclose techniques of devising a pulse or an offset signal to be applied to a focus error signal, so as to stabilize the focus control upon such an interlayer jump.

The foregoing documents, however, do not disclose an idea that a correction quantity of the spherical aberration is changed for each recording layer upon an interlayer jump. In the case where the NA is not less than 0.8, when an interlayer jump is made without changing the spherical aberration correction quantity, the following problems arise.

FIG. 18 is a flowchart illustrating an operation when an interlayer jump is carried out. When the control circuit issues an interlayer jump command (or the control circuit receives an interlayer jump command from another circuit) while a recording/reproducing operation is carried out with the focus control being conducted with respect to a first recording layer (hereinafter referred to as "first layer") (Step 901), the control circuit generates an interlayer jump signal (Step 902), the focus position is moved to the second recording layer (hereinafter referred to as "second layer") (Step 903), and a recording/reproducing operation is carried out to a second layer (Step 904). FIG. 19 is a timing chart of respective signals in the foregoing operation. The interlayer jump signal varies in response to a signal corresponding to the interlayer jump command at Step 901 as a trigger (Step 902). The interlayer jump signal is, as shown in the figure, composed of a kick pulse KP for leaving a loop for focus control with respect to the first layer and starting to move the objective lens so that the focus position is moved to the second layer, and a brake pulse BP for stopping the moving of the objective lens and entering a loop for focus control with respect to the second layer.

In such an interlayer jump operation, during the recording/reproduction with respect to the first layer before a jump, the spherical aberration correction quantity is optimal with respect to the first layer. Therefore, if the focus position is moved to the second layer without any change to the correction state of the spherical aberration, a spherical aberration occurs due to the thickness of the intermediate layer 65 between the first and second layers. This results in the deterioration of the focus control signal (the deterioration of the amplitude and linearity of the focus error (FE) signal, the occurrence of an offset, etc.), thereby making the focus control with respect to the second layer unstable. Further, though it is effective to refer to a magnitude of a reproduction signal so as to confirm whether or not the focus control functions normally, this also raises the following problem. Namely, if a spherical aberration occurs when the focus position is moved to the second layer, the reproduction signal has a smaller amplitude, thereby making it impossible to check whether or not the focus control is carried out normally.

SUMMARY OF THE INVENTION

Therefore, to solve the aforementioned problems, it is an object of the present invention to provide a stable interlayer jump by improving operations of an optical system that performs the focus position moving and the spherical aberration correction upon an interlayer jump, in the case where the numerical aperture (NA) of an objective lens that converges a light beam to form a microspot at the diffraction limit on an optical disk is increased to not less than 0.8 and information is recorded/reproduced to/from a multi-layer optical disk having not less than two recording layers by making interlayer jumps in order to obtain a higher recording density of an optical disk.

To achieve the foregoing object, the present invention has the following configuration.

An optical disk device of the present invention comprises: an optical pickup including a laser light source, a convergent optical system having an objective lens that receives a light beam emitted from the laser light source and converges the same to form a microspot on an optical disk, a photodetector that receives the light beam reflected from the optical disk and outputs an electric signal according to a quantity of the received light, and an aberration correcting optical system that controls a spherical aberration of the convergent optical system; a motor that rotates the optical disk; and a control circuit that receives a signal obtained from the optical pickup, and controls and drives the laser light source, the objective lens, the aberration correcting optical system, and the motor. Besides, the optical disk device performs information recording or reproduction with respect to a multi-layer optical disk having at least a first recording layer and a second recording layer, the optical disk device. The optical disk device is characterized in that an operation of changing a correction quantity of the spherical aberration from a value adequate for the first recording layer to a predetermined value is started before an operation of moving a focus position of the microspot from the first layer to the second layer is completed.

This ensures that the spherical aberration correction adequate for the second layer has been carried out when the focus control with respect to the second layer is performed. Therefore, this allows the focus control to be performed stably, thereby preventing the focus control from failing due to an unsuccessful interlayer jump.

A first preferable configuration of the optical disk device of the present invention is characterized in that the operation of moving the focus position of the microspot and the operation of changing the correction quantity of the spherical aberration are started substantially simultaneously.

By starting the operation of moving the focus position from the first layer to the second layer substantially simultaneously when the operation of changing the correction quantity of the spherical aberration is started, the interlayer jump can be carried out in a short time.

A second preferable configuration of the optical disk device of the present invention is characterized in that the operation of changing the correction quantity of the spherical aberration is started before the operation of moving the focus position of the microspot is started.

This allows the spherical aberration correction adequate for the second layer substantially to be completed by the time the focus control is performed with respect to the second layer, thereby allowing the focus control to be performed stably without being affected adversely by the spherical aberration. Therefore, this more certainly prevents the focus control from failing due to an unsuccessful interlayer jump.

In the second preferable configuration of the optical disk device, the operation of moving the focus position of the microspot preferably is started after the operation of changing the correction quantity of the spherical aberration is completed.

This allows the spherical aberration correction adequate for the second layer to be completed with certainty by the time the focus control is performed with respect to the second layer, thereby allowing the focus control to be performed stably without being affected adversely by the spherical aberration. Therefore, this most certainly prevents the focus control from failing due to an unsuccessful interlayer jump.

In the first and second preferable configurations of the optical disk device, the operation of changing the correction quantity of the spherical aberration preferably is completed during the operation of moving the focus position of the microspot.

By completing the operation of changing the correction quantity of the spherical aberration before the focus position reaches the second layer, the focus control can be performed more stably with respect to the second layer.

Furthermore, in the first and second preferable configurations of the optical disk device, the operation of moving the focus position of the microspot preferably is completed before the operation of changing the correction quantity of the spherical aberration is completed.

In the case where it takes much time to change the correction quantity of the spherical aberration, the time required for carrying out an interlayer jump is shortened by completing the operation of moving the focus position to the second layer before the operation of changing the correction quantity of the spherical aberration is completed.

Furthermore, in the foregoing optical disk device of the present invention, the quantity of a change in the correction quantity of the spherical aberration preferably is according to a standard thickness of an intermediate layer between the first recording layer and the second recording layer.

This allows the focus control with respect to the second layer to be performed stably, thereby allowing a recording or reproducing operation to be performed on the second layer immediately after an interlayer jump. Besides, a setup time following the loading of an optical disk in the optical disk device or the turning on of the optical disk device can be shortened.

Alternatively, in the optical disk device of the present invention, a quantity of a change in the correction quantity of the spherical aberration may be according to approximately half of a standard thickness of an intermediate layer between the first recording layer and the second recording layer.

This ensures the stability of the focus control with respect to the first layer before an interlayer jump. Particularly in the case where the operation of changing the correction quantity of the spherical aberration is started before the operation of moving the focus position, a significant effect that the focus control to the first layer is stabilized and the focus control is prevented from failing can be achieved. Besides, a setup time following the loading of an optical disk in the optical disk device or the turning on of the optical disk device can be shortened.

Furthermore, in the optical disk device of the present invention, a quantity of a change in the correction quantity of the spherical aberration preferably is a difference between a correction quantity of a spherical aberration adequate for the first recording layer and a correction quantity of a spherical aberration adequate for the second recording layer, which are obtained by learning when the multi-layer disk is loaded in the optical disk device or when the optical disk device is turned on.

This allows the focus control with respect to the second layer to be performed stably, thereby allowing a recording or reproducing operation to be performed on the second layer immediately after an interlayer jump. Besides, by previously learning a quantity of a change in the correction quantity of the spherical aberration that is necessary upon an interlayer jump, it is possible to realize a more stable interlayer jump.

Alternatively, the quantity of a change in the correction quantity of the spherical aberration may be approximately half of a difference between a correction quantity of a spherical aberration adequate for the first recording layer and a correction quantity of a spherical aberration adequate for the second recording layer, which are obtained by learning when the multi-layer disk is loaded in the optical disk device or when the optical disk device is turned on.

This ensures the stability of the focus control with respect to the first layer before an interlayer jump. Particularly in the case where the operation of changing the correction quantity of the spherical aberration is started before the operation of moving the focus position, a significant effect in which the focus control to the first layer is stabilized and the focus control is prevented from failing can be achieved. Besides, by previously learning a quantity of a change in the correction quantity of the spherical aberration that is necessary upon an interlayer jump, it is possible to realize a more stable interlayer jump.

Next, an information recording/reproducing method of the present invention is a method for performing information recording or reproduction with respect to a multi-layer optical disk having at least a first recording layer and a second recording layer by utilizing an optical disk device.

The optical disk device includes: an optical pickup including a laser light source, a convergent optical system having an objective lens that receives a light beam emitted from the laser light source and converges the same to form a microspot on an optical disk, a photodetector that receives the light beam reflected from the optical disk and outputs an electric signal according to a quantity of the received light, and an aberration correcting optical system that controls a spherical aberration of the convergent optical system; a motor that rotates the optical disk; and a control circuit that receives a signal obtained from the optical pickup, and controls and drives the laser light source, the objective lens, the aberration correcting optical system, and the motor. The method includes the steps of moving a focus position of the microspot from the first layer to the second layer, and changing a correction quantity of the spherical aberration from a value adequate for the first recording layer to a predetermined value, and is characterized in that the correction quantity changing step is started before the focus position moving step is completed.

This ensures that the spherical aberration correction adequate for the second layer has been carried out when the focus control with respect to the second layer is performed. Therefore, this allows the focus control to be performed stably, thereby preventing the focus control from failing due to an unsuccessful interlayer jump.

A first preferable configuration of the recording/reproducing method of the present invention is characterized in that the focus position moving step and the correction quantity changing step are started substantially simultaneously.

By starting the operation of moving the focus position from the first layer to the second layer substantially simultaneously when the operation of changing the correction quantity of the spherical aberration is started, the interlayer jump can be carried out in a short time.

A second preferable configuration of the recording/reproducing method of the present invention is characterized in that the correction quantity changing step is started before the focus position moving step is started.

This allows the spherical aberration correction adequate for the second layer substantially to be completed by the time the focus control is performed with respect to the second layer, thereby allowing the focus control to be performed stably without being affected adversely by the spherical aberration. Therefore, this more certainly prevents the focus control from failing due to an unsuccessful interlayer jump.

In the second preferable configuration of the recording/ reproducing method, the focus position moving step preferably is started after the correction quantity changing step is completed.

This allows the spherical aberration correction adequate for the second layer to be completed with certainty by the time the focus control is performed with respect to the second layer, thereby allowing the focus control to be performed stably without being affected adversely by the spherical aberration. Therefore, this most certainly prevents the focus control from failing due to an unsuccessful interlayer jump.

In the first and second configurations of the recording/ reproducing method, the correction quantity changing step preferably is completed while the focus position moving step is being carried out.

By completing the operation of changing the correction quantity of the spherical aberration before the focus position reaches the second layer, the focus control can be performed more stably with respect to the second layer.

Furthermore, in the first and second preferable configurations of the recording/reproducing method, the focus position moving step preferably is completed before the correction quantity changing step is completed.

In the case where it takes much time to change the correction quantity of the spherical aberration, the time required for carrying out an interlayer jump is shortened by completing the operation of moving the focus position to the second layer before the operation of changing the correction quantity of the spherical aberration is completed.

Furthermore, in the recording/reproducing method of the present invention, the quantity of a change in the correction quantity of the spherical aberration preferably is according to a standard thickness of an intermediate layer between the first recording layer and the second recording layer.

This allows the focus control with respect to the second layer to be performed stably, thereby allowing a recording or reproducing operation to be performed on the second layer immediately after an interlayer jump. Besides, a setup time following the loading of an optical disk in the optical disk device or the turning on of the optical disk device can be shortened.

Alternatively, in the recording/reproducing method of the present invention, the quantity of a change in the correction quantity of the spherical aberration may be according to approximately half of a standard thickness of an intermediate layer between the first recording layer and the second recording layer.

This ensures the stability of the focus control with respect to the first layer before an interlayer jump. Particularly in the case where the operation of changing the correction quantity of the spherical aberration is started before the operation of moving the focus position, a significant effect in which the focus control to the first layer is stabilized and the focus control is prevented from failing can be achieved. Besides, a setup time following the loading of an optical disk in the optical disk device or the turning on of the optical disk device can be shortened.

In the recording/reproducing method of the present invention, the quantity of a change in the correction quantity of the spherical aberration preferably is a difference between a correction quantity of a spherical aberration adequate for the first recording layer and a correction quantity of a spherical aberration adequate for the second recording layer, which are obtained by learning when the multi-layer disk is loaded in the optical disk device or when the optical disk device is turned on.

This allows the focus control with respect to the second layer to be performed stably, thereby allowing a recording or reproducing operation to be performed to the second layer immediately after an interlayer jump. Besides, by previously learning the quantity of a change in the correction quantity of the spherical aberration that is necessary upon an interlayer jump, it is possible to realize a more stable interlayer jump.

Alternatively, the quantity of a change in the correction quantity of the spherical aberration may be approximately half of a difference between a correction quantity of a spherical aberration adequate for the first recording layer and a correction quantity of a spherical aberration adequate for the second recording layer, which are obtained by learning when the multi-layer disk is loaded in the optical disk device or when the optical disk device is turned on.

This ensures the stability of the focus control with respect to the first layer before an interlayer jump. Particularly in the case where the operation of changing the correction quantity of the spherical aberration is started before the operation of moving the focus position, a significant effect that the focus control to the first layer is stabilized and the focus control is prevented from failing can be achieved. Besides, by previously learning the quantity of a change in the correction quantity of the spherical aberration that is necessary upon an interlayer jump, it is possible to realize a more stable interlayer jump.

Next, a computer of the present invention includes: the optical disk device of the present invention; an input device or an input terminal for inputting information; a computing device that performs a computation based on at least one of information inputted through the input device or the input terminal and information reproduced from the optical disk device; and an output device or an output terminal for displaying or outputting at least one of information inputted through the input device or the input terminal, information reproduced from the optical disk device, and a result of a computation of the computing device.

Since the optical disk device of the present invention is capable of carrying out an interlayer jump in a multi-layer optical disk stably and speedily, the computer of the present invention is capable of recording/reproducing information stably and speedily.

Next, an optical disk player of the present invention includes: the optical disk device of the present invention; and an information-image converting device for converting information signals obtained from the optical disk device into images.

Since the optical disk device of the present invention is capable of carrying out an interlayer jump in a multi-layer optical disk stably and speedily, the optical disk player of the present invention is capable of recording/reproducing information stably and speedily.

Next, an optical disk recorder of the present invention includes: the optical disk device of the present invention; and an image-information converting device for converting image information into information signals that can be recorded by means of the optical disk device.

Since the optical disk device of the present invention is capable of carrying out an interlayer jump in a multi-layer optical disk stably and speedily, the optical disk recorder of the present invention is capable of recording/reproducing information stably and speedily.

Next, an optical disk server of the present invention includes: an optical disk device and a wireless input/output terminal. The optical disk device includes: an optical pickup including a laser light source, a convergent optical system having an objective lens that receives a light beam emitted from the laser light source and converges the same to form a microspot on an optical disk, a photodetector that receives the light beam reflected from the optical disk and outputs an electric signal according to a quantity of the received light, and an aberration correcting optical system that controls a spherical aberration of the convergent optical system; a motor that rotates the optical disk; and a control circuit that receives a signal obtained from the optical pickup, and controls and drives the laser light source, the objective lens, the aberration correcting optical system, and the motor.

This allows the optical disk server to communicate information with a plurality of devices having wireless receiving/transmitting terminals, for instance, computers, telephones, and TV tuners. Therefore, it is possible to utilize the optical disk server as an information server (optical disk server) common to these plural devices.

In the optical disk server of the present invention, preferably, the optical disk device performs information recording or reproduction with respect to a multi-layer optical disk having at least a first recording layer and a second recording layer, and an operation of changing a correction quantity of the spherical aberration from a value adequate for the first recording layer to a predetermined value is started before an operation of moving a focus position of the microspot from the first layer to the second layer is completed. In other words, the optical disk device composing the foregoing optical disk server of the present invention preferably is the optical disk device of the present invention.

Since the optical disk device of the present invention is capable of carrying out an interlayer jump in a multi-layer optical disk stably and speedily, the preferable optical disk server of the present invention is capable of recording/reproducing information stably and speedily.

BRIEF DESCRIPTION OF THE DRAWINGS

FIG. 1 is a flowchart illustrating a procedure of a focus position moving operation and a spherical aberration correcting operation upon an interlayer jump operation in an optical disk device according to a first embodiment of the present invention.

FIG. 11 is a view illustrating a schematic configuration of an optical disk player according to a fifth embodiment of the present invention.

FIG. 14 is a view illustrating a schematic configuration of an optical pickup according to the embodiments of the present invention as well as the prior art.

FIG. 15 is a schematic cross-sectional view of an optical disk device according to the embodiments of the present invention as well as the prior art.

DETAILED DESCRIPTION OF THE INVENTION

First Embodiment

Figure 2:
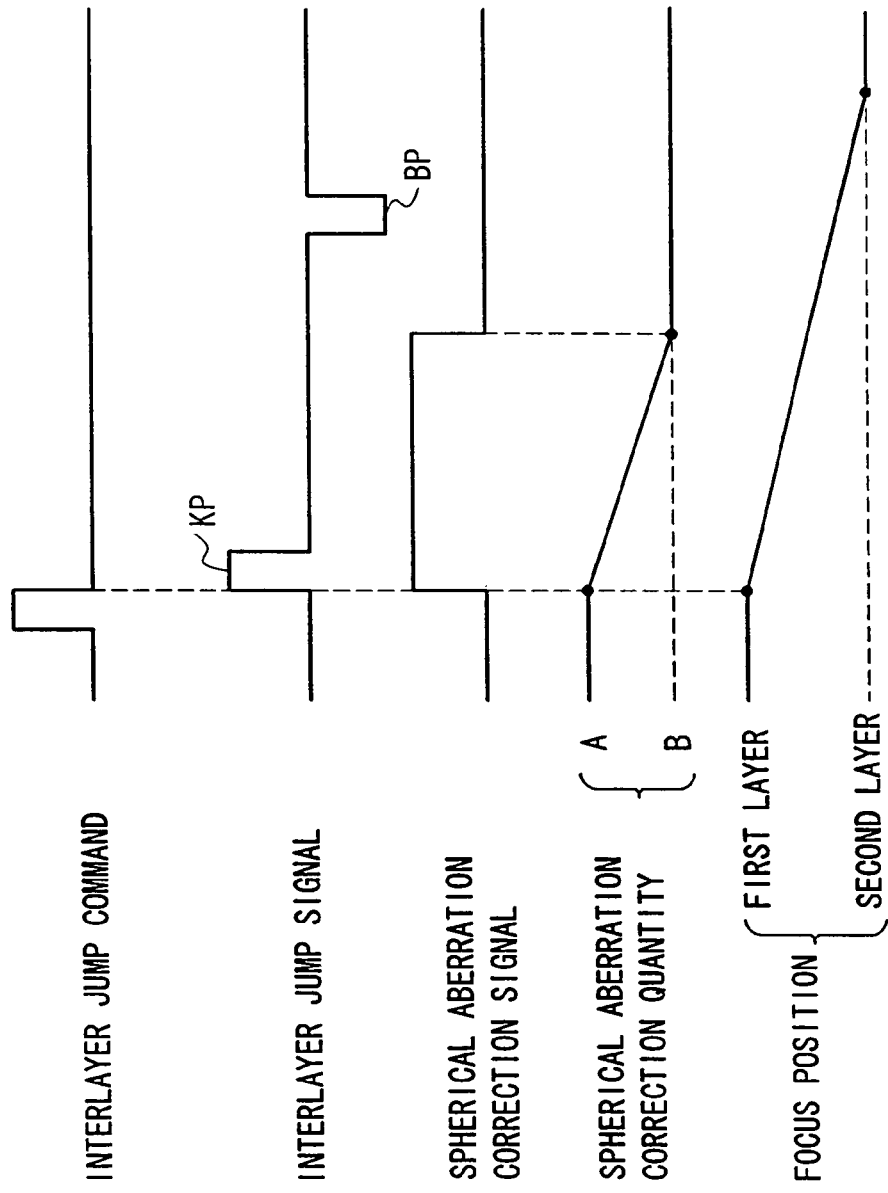
FIG. 2 is a timing chart illustrating an example of variations of respective signals upon an interlayer jump operation in the optical disk device according to the first embodiment of the present invention.

An optical disk device of a first embodiment of the present invention has the same basic configuration as that of the conventional optical disk device. As shown in FIG. 15, the optical disk device has an optical pickup 11 equipped with an aberration correcting element (aberration correcting optical system) 4, an aberration correcting element (optical system) driving circuit 8 that drives the aberration correcting element 4, a motor 117 for rotating an optical disk 6, and a control circuit 118 that receives a signal obtained from the optical pickup 11 and controls and drives the motor 117, an objective lens 5, the aberration correcting element (optical system) driving circuit 8, and a laser light source 1. The aberration correcting optical system is not limited to the liquid crystal aberration correcting element 4 shown in FIGS. 14 and 15, but may be an aberration correcting lens group 201 shown in FIG. 16, or another known optical system capable of correcting spherical aberrations.

An optical disk device and a recording/reproducing method according to the present invention are effective for the recording (hereinafter "recording" includes "erasure")/reproduction with respect to a multi-layer optical disk having not less than two recording layers (these may be recording layers with any types such as read-only, write-once, and overwritable layers). However, the recording or reproduction with respect to an optical disk having a single recording layer (hereinafter referred to as "single-layer optical disk") by the optical disk device of the present invention is not prohibited. The optical disk device of the present invention is capable of recording/reproducing information to/from both a single-layer optical disk or a multi-layer optical disk.

FIG. 1 is a flowchart illustrating a procedure of a focus position moving operation and a spherical aberration correcting operation upon an interlayer jump operation according to the first embodiment of the present invention.

In FIG. 1, when the control circuit issues an interlayer jump command (or receives an interlayer jump command from another circuit not shown) while a recording or reproducing operation is being carried out with the focus control being conducted with respect to a first recording layer (hereinafter referred to as "first layer") (Step 801), the control circuit generates a spherical aberration correction signal and an interlayer jump signal substantially simultaneously (Steps 802, 803). An aberration correcting means changes a correction quantity of the spherical aberration to a predetermined value that is set by considering an adequate correction quantity for a second recording layer (hereinafter referred to as "second layer") as a destination of the jump (Step 804). At the same time, a focus control means moves the focus position to the second layer (Step 805). Then, the information recording/reproduction is carried out with the focus control performed with respect to the second layer (Step 806).

Thus, since the spherical aberration correction quantity is changed while the focus position is being moved, the spherical aberration correction has been carried out by the time the focus control is carried out with respect to the second layer. Therefore, the following effect can be achieved: the focus control is carried out stably, and it is possible to prevent the focus control from failing due to an unsuccessful interlayer jump.

FIG. 2 is a timing chart illustrating, as an example, how the respective signals vary upon the foregoing jumping operation. In FIG. 2, the horizontal axis indicates time, and the vertical axis indicates voltage.

Figure 16:
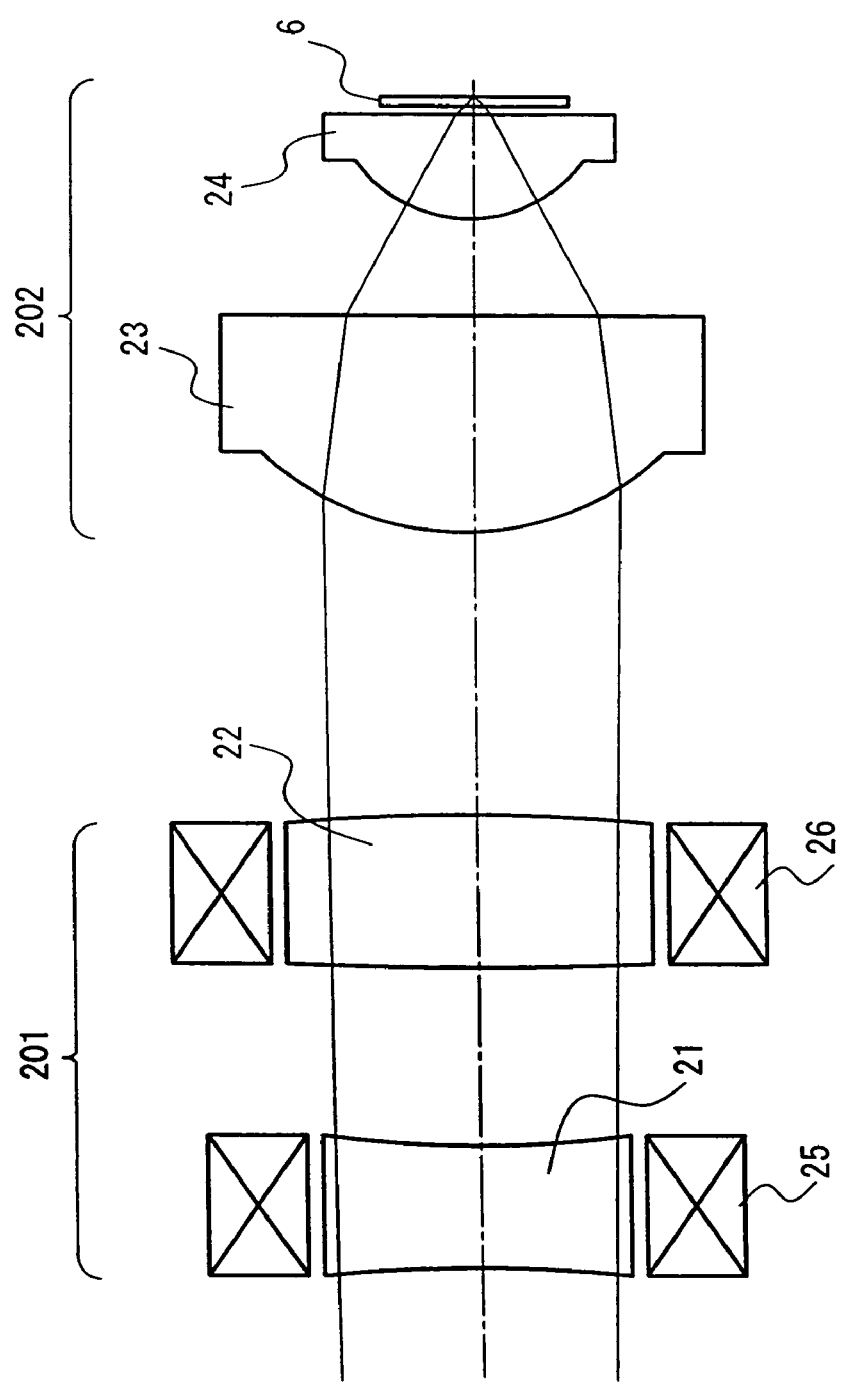
FIG. 16 is a schematic cross-sectional view of another optical pickup according to the embodiments of the present invention as well as the prior art.

When an interlayer jump command at Step 801 described above is issued while the focus control is being carried out with respect to the first layer, the interlayer jump signal (Step 803 above) and the spherical aberration correction signal (Step 802 above) vary in response to a signal corresponding to the interlayer jump command as a trigger. The interlayer jump signal is composed of a kick pulse KP for leaving a loop for focus control with respect to the first layer, from which information has been recorded/reproduced until then, and starting to move the objective lens so that the focus position is moved to the second layer, and a brake pulse BP for stopping the moving of the objective lens so as to enter a loop for focus control with respect to the second layer. The spherical aberration correction signal has a signal waveform shown in FIG. 2 that is a waveform in the case where the negative and positive lens groups 21 and 22 constituting the spherical aberration correcting lens group 201 shown in FIG. 16 are moved by screw-feeding or another driving technique. In response to a signal corresponding to the interlayer jump command as a trigger, a voltage for varying a distance between the negative lens group 21 and the positive lens group 22 is applied to the driving means 25 and 26 until the spherical aberration correction quantity changes from a correction quantity A that is adequate for the first layer to a correction quantity B that is predetermined.

In the present invention, since the change of the spherical aberration correction quantity is started before the moving of the focus position to the second layer is completed, that is, before the interlayer jump is completed, the spherical aberration correction suitable for the second layer has been carried out when the focus control is performed with respect to the second layer. Therefore, the following effect can be achieved: the focus control is carried out stably, and it is possible to prevent the focus control from failing due to an unsuccessful interlayer jump.

Furthermore, by starting the moving of the focus position from the first layer to the second layer substantially at the same time when the change of the spherical aberration correction quantity is started as shown in FIG. 2, an effect in which an interlayer jump can be carried out within a short time is achieved.

Furthermore, by completing the change of the spherical aberration correction quantity before the moving of the focus position to the second layer is completed as shown in FIG. 2, an effect in which the focus control can be performed more stably is achieved.

Figure 3:
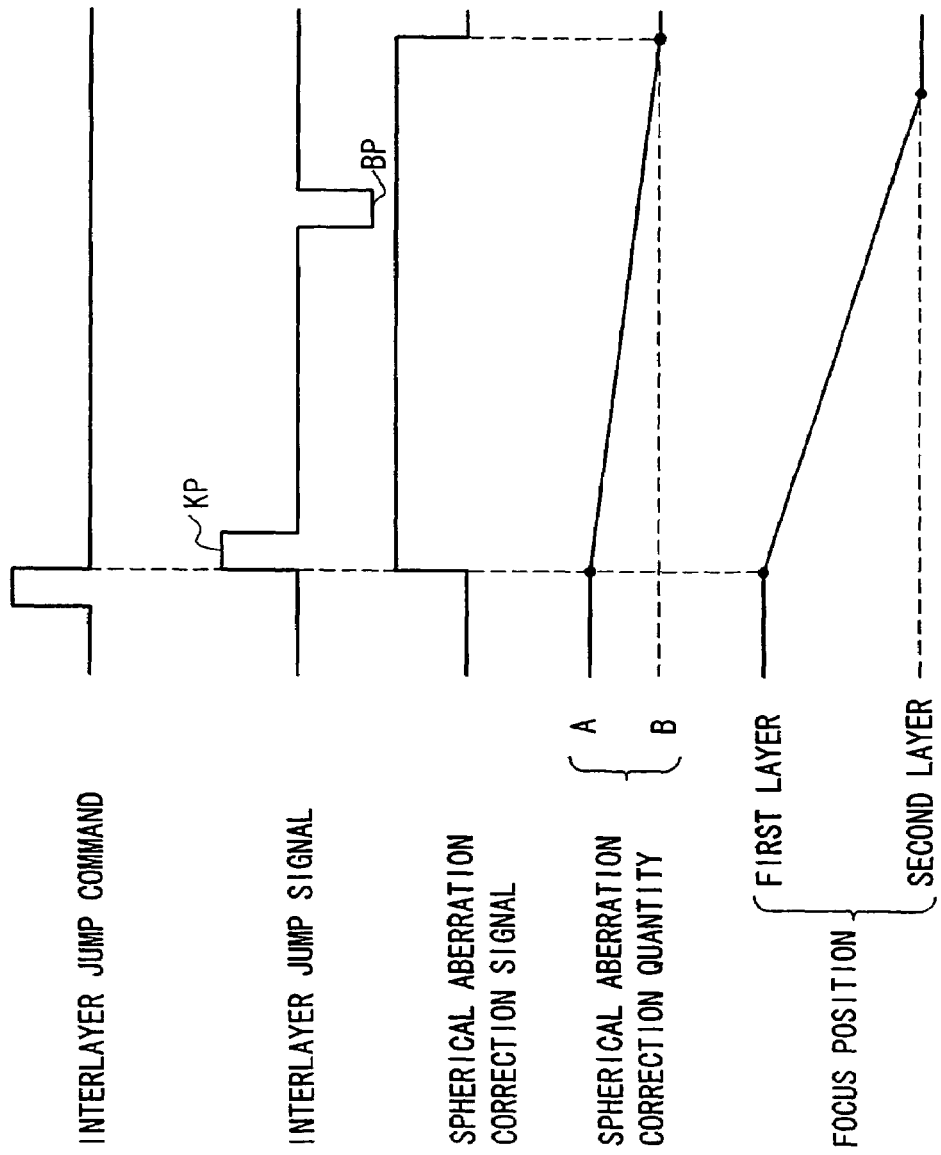
FIG. 3 is a timing chart illustrating another example of variations of respective signals upon an interlayer jump operation in the optical disk device according to the first embodiment of the present invention.

In the case where the change of the spherical aberration correction quantity requires much time, however, the moving of the focus position may be completed before the change of the spherical aberration correction quantity is completed, as shown in FIG. 3. By so doing, an effect in which the time required for the interlayer jump can be shortened further is achieved.

Second Embodiment

The following description will depict a second embodiment of the present invention. An optical disk device according to the second embodiment has the same basic configuration as that of the optical disk device according to the first embodiment, and descriptions of the same will be omitted.

Figure 4:
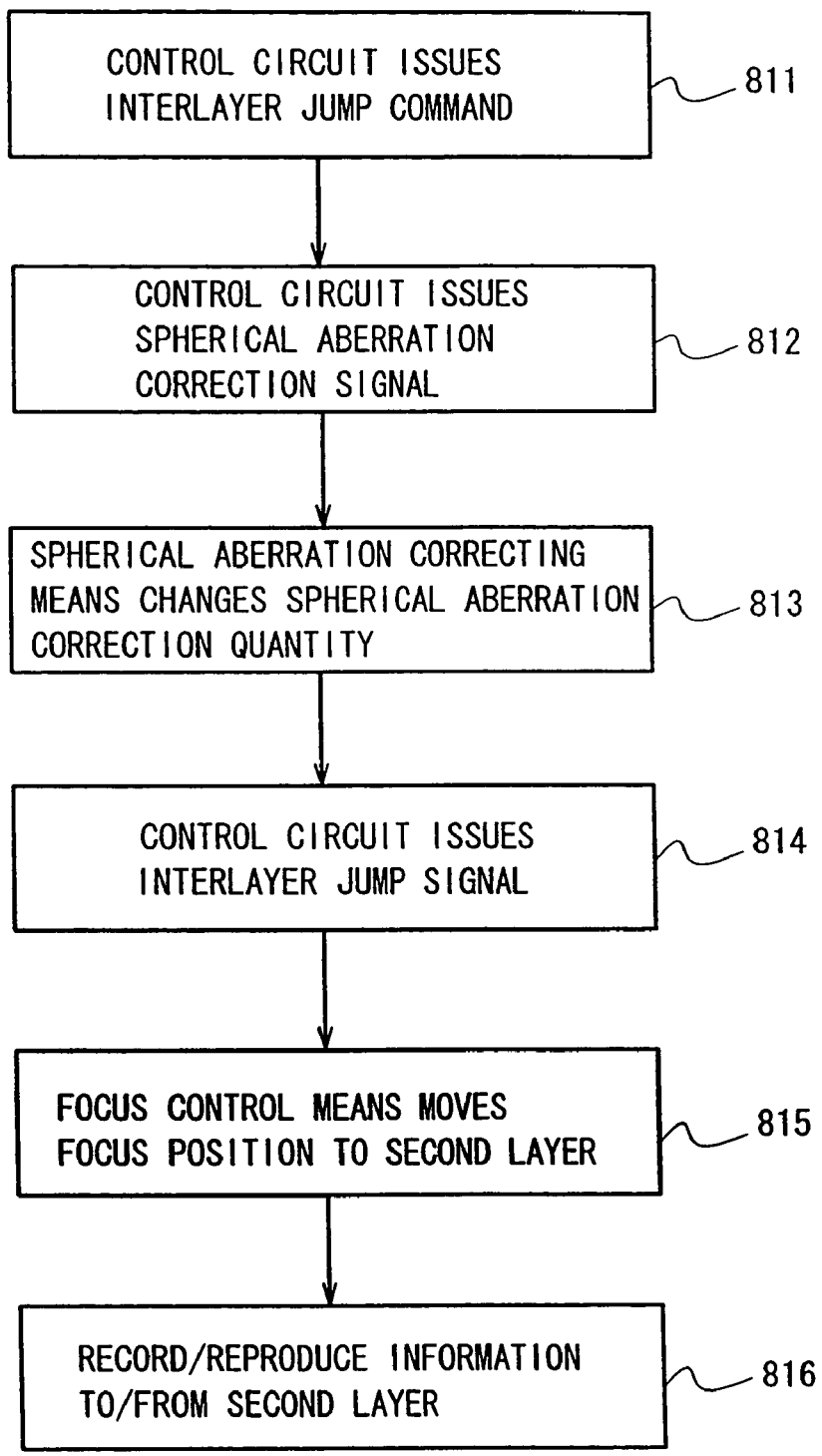
FIG. 4 is a flowchart illustrating a procedure of a focus position moving operation and a spherical aberration correcting operation upon an interlayer jump operation in an optical disk device according to a second embodiment of the present invention.

FIG. 4 is a flowchart illustrating a procedure of a focus position moving operation and a spherical aberration correcting operation upon an interlayer jump operation according to the second embodiment of the present invention.

In FIG. 4, when the control circuit issues an interlayer jump command (or receives an interlayer jump command from another circuit not shown) while a recording or reproducing operation is carried out with the focus control being conducted with respect to the first layer (Step 811), the control circuit generates a spherical aberration correction signal (Step 812) and the aberration correcting means changes the spherical aberration correction quantity to a predetermined value that is set by considering an optimal correction quantity for the second layer as a destination of the jump (Step 813). Thereafter, the control circuit generates an interlayer jump signal (Step 814), and the focus control means moves the focus position to the second layer (Step 815). Then, the information recording/reproduction is carried out with the focus control performed with respect to the second layer (Step 816).

Thus, since the spherical aberration correction quantity is changed before the focus position is moved, the spherical aberration correction suitable for the second layer substantially has been completed by the time the focus control is carried out with respect to the second layer. Therefore, the following effect can be achieved: the focus control is carried out stably with respect to the second layer without being affected adversely by the spherical aberration, and it is possible to prevent the focus control from failing due to an unsuccessful interlayer jump.

Figure 5:
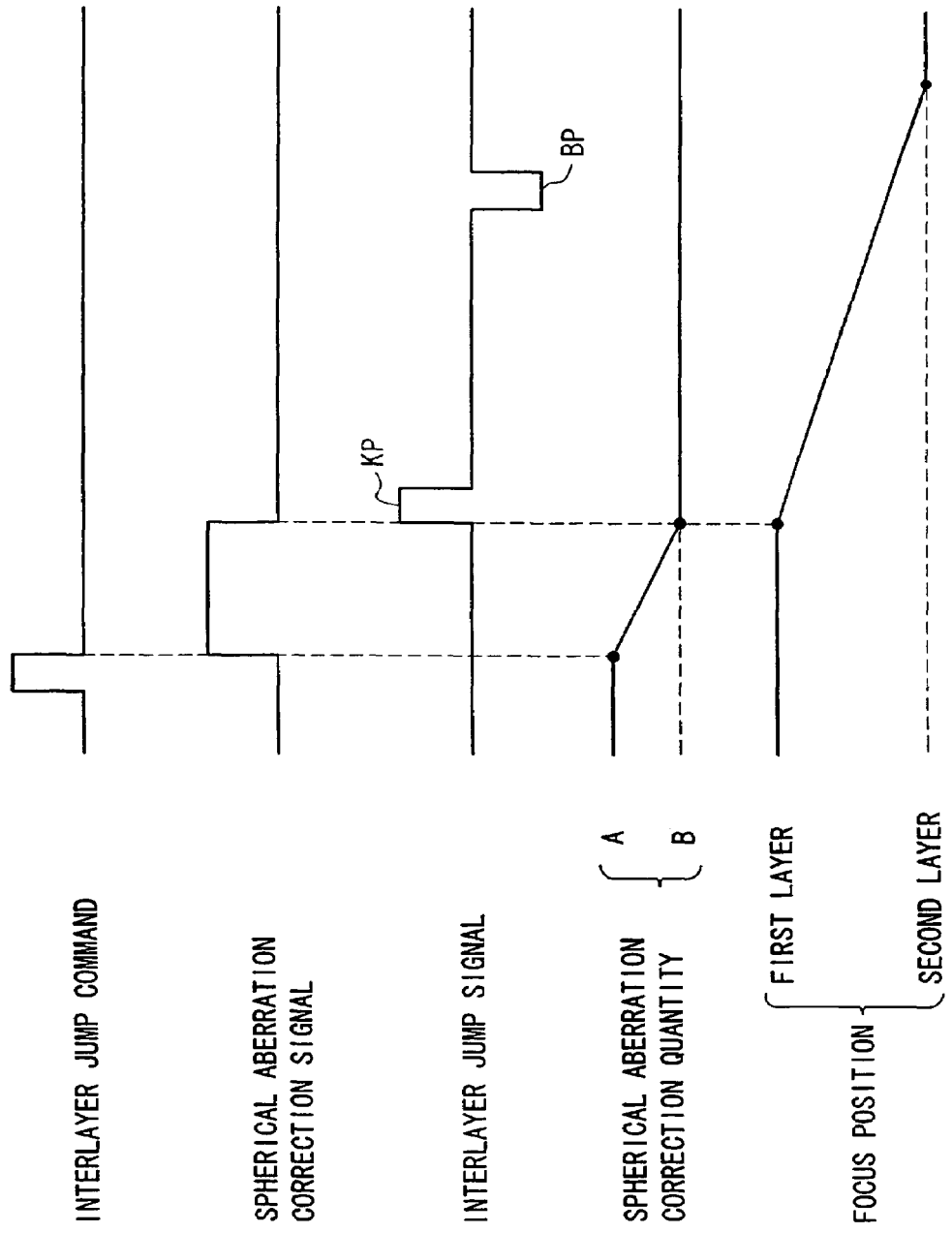
FIG. 5 is a timing chart illustrating an example of variations of respective signals upon an interlayer jump operation in the optical disk device according to the second embodiment of the present invention.

FIG. 5 is a timing chart illustrating, as an example, how the respective signals vary upon the foregoing jumping operation. In FIG. 5, the horizontal axis indicates time, and the vertical axis indicates voltage.

When an interlayer jump command at Step 811 described above is issued while the focus control is being carried out with respect to the first layer, the spherical aberration correction signal varies in response to a signal corresponding to the interlayer jump command as a trigger (Step 812 above). The spherical aberration correction signal has a signal waveform shown in FIG. 5 that is a waveform in the case where the negative and positive lens groups 21 and 22 constituting the spherical aberration correcting lens group 201 shown in FIG. 16 are moved by screw-feeding or another driving technique. In response to a signal corresponding to the interlayer jump command as a trigger, a voltage for varying a distance between the negative lens group 21 and the positive lens group 22 is applied to the driving means 25 and 26 until the spherical aberration correction quantity changes from a correction quantity A that is adequate for the first layer to a correction quantity B that is predetermined. Subsequently, the interlayer jump signal varies (Step 814 above). The interlayer jump signal is composed of a kick pulse KP for leaving a loop for focus control with respect to the first layer, from which information has been recorded/reproduced until then, and starting to move the objective lens so that the focus position is moved to the second layer, and a brake pulse BP for stopping the moving of the objective lens so as to enter a loop for focus control with respect to the second layer.

In the second embodiment of the present invention as well, like in the first embodiment, the change of the spherical aberration correction quantity is started before the moving of the focus position to the second layer is completed, that is, before the interlayer jump is completed. Therefore, the spherical aberration correction suitable for the second layer has been carried out when the focus control is performed with respect to the second layer. Consequently, the following effect can be achieved: the focus control is carried out stably, and it is possible to prevent the focus control from failing due to an unsuccessful interlayer jump.

Furthermore, in the second embodiment, since the change of the spherical aberration correction quantity is started before the moving of the focus position from the first layer to the second layer as shown in FIG. 5, the following effect can be achieved: the spherical aberration correction quantity when the focus position arrives at the second layer can be reduced with certainty, thereby making it possible to perform the focus control with respect to the second layer more stably.

Furthermore, as shown in FIG. 5, by issuing an interlayer jump signal after the change of the spherical aberration correction quantity is completed, the following effect can be achieved: the focus control can be performed more stably without being adversely affected by the spherical aberration, when the focus control is performed with respect to the second layer.

Figure 6:
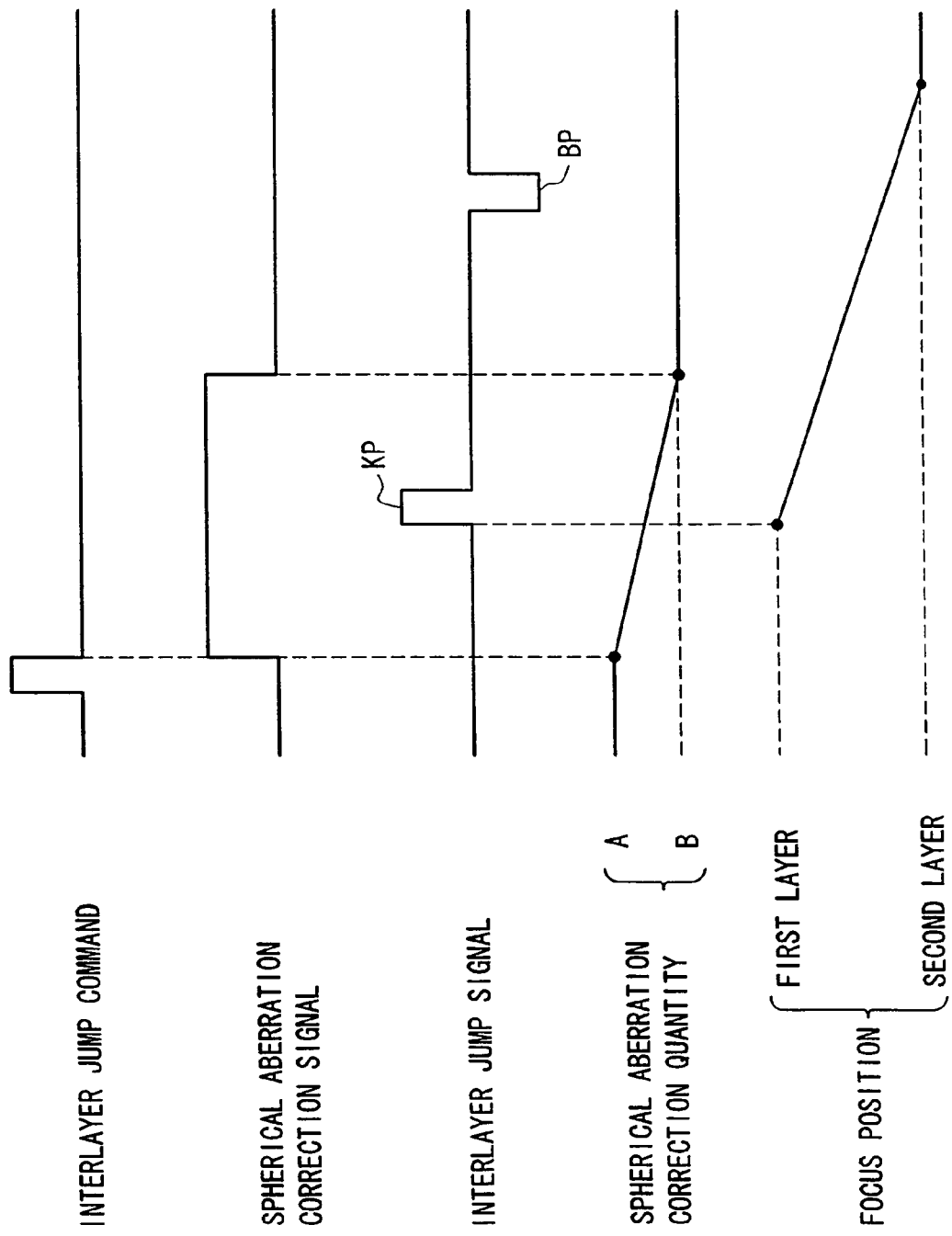
FIG. 6 is a timing chart illustrating another example of variations of respective signals upon an interlayer jump operation in the optical disk device according to the second embodiment of the present invention.

However, the interlayer jump signal may be issued so as to start the moving of the focus position before the change of the spherical aberration correction quantity is completed, as shown in FIG. 6. In this case, as shown in FIG. 6, the change of the spherical aberration correction quantity should be completed before the moving of the focus position to the second layer is completed (that is, before entering the focus control loop for the second layer). By so doing, the following effect can be achieved: the focus control stably can be performed with respect to the second layer, and moreover, this makes it possible to reduce the time required for the interlayer jump.

Figure 7:
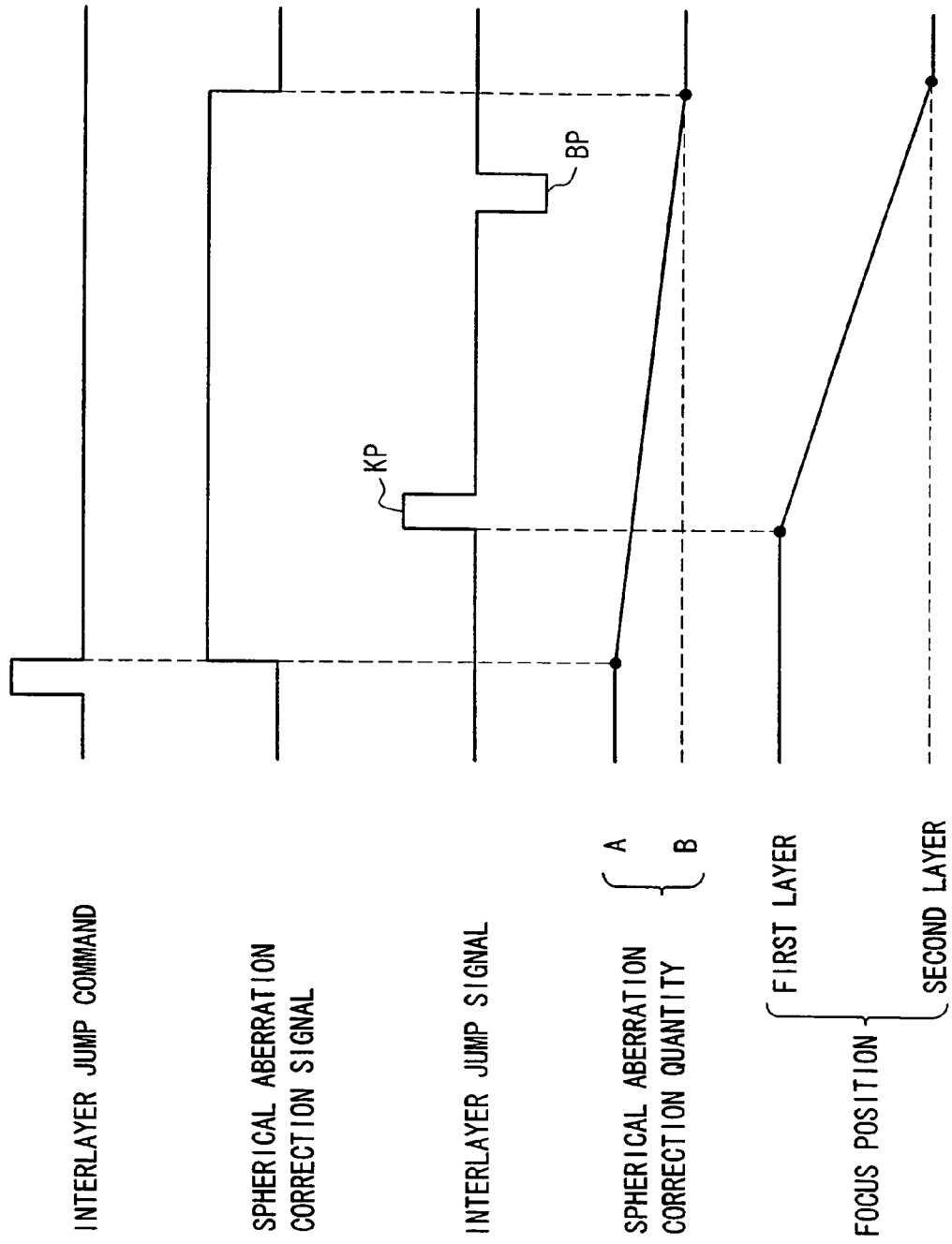
FIG. 7 is a timing chart illustrating still another example of variations of respective signals upon an interlayer jump operation in the optical disk device according to the second embodiment of the present invention.

Furthermore, in the case where the change of the spherical aberration correction quantity requires much time, the moving of the focus position to the second layer may be completed before the change of the spherical aberration correction quantity is completed, as shown in FIG. 7. By so doing, an effect of reduction of the time required for an interlayer jump can be achieved.

Figure 8:
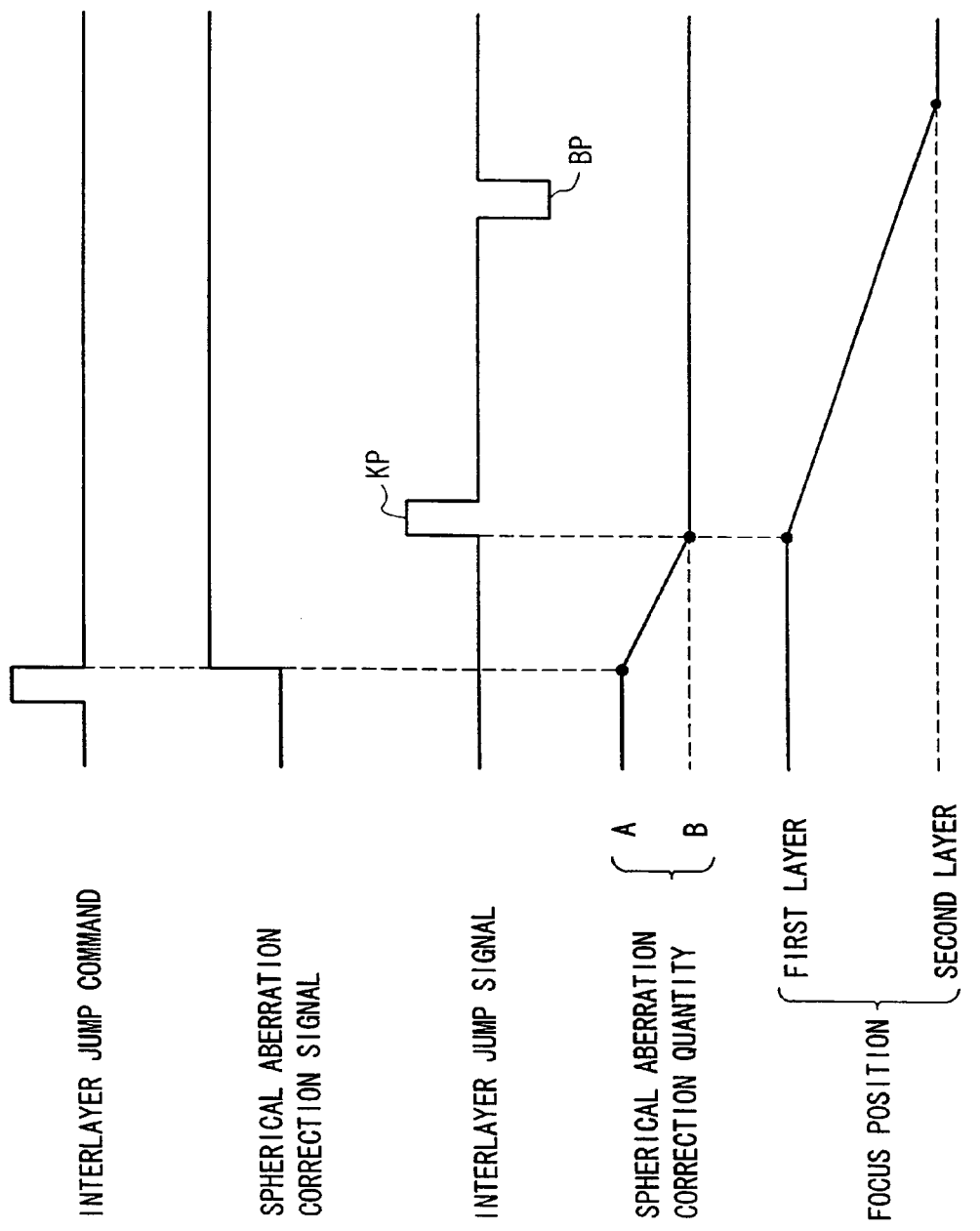
FIG. 8 is a timing chart illustrating still another example of variations of respective signals upon an interlayer jump operation in the optical disk device according to the present invention.

It should be noted that the timing charts shown in conjunction with the first and second embodiments described above illustrate, as examples, signal waveforms of the spherical aberration correction signal in the case where the negative and positive lens groups 21 and 22 constituting the spherical aberration correcting lens group 201 shown in FIG. 16 are moved by screw-feeding or another driving technique. In this case, as shown in the figures, a voltage for varying a distance between the negative lens group 21 and the positive lens group 22 may be applied continuously to the driving means 25 and 26 in response to a signal corresponding to the interlayer jump command as a trigger until the spherical aberration correction quantity reaches the predetermined correction quantity B. On the other hand, in the case where the aberration correcting optical system is composed of the liquid crystal aberration correcting element 4 shown in FIG. 14, or in the case where the optical system utilizing the spherical aberration correcting lens group 201 shown in FIG. 16 includes a magnetic spring as a mechanism for moving the lens group, the voltage of the spherical aberration correction signal is equivalent to the spherical aberration correction quantity. Therefore, in such a case, the voltage equivalent to the predetermined spherical aberration correction quantity B may remain applied continuously as the spherical aberration correction signal after the interlayer jump signal is applied, as shown in FIG. 8 (FIG. 8 shows an example of a timing chart of FIG. 5 modified so that the voltage equivalent to the spherical aberration correction quantity B remains applied continuously as the spherical aberration correction signal, and this modification likewise is applicable to the other timing charts).

Third Embodiment

The description of the present embodiment below will depict various application examples of the present invention.

As described above, in the present invention, the change of the spherical aberration correction quantity is started before the moving of the focus position to the second layer is completed. Therefore, it is preferable to determine previously the quantity of a change when the spherical aberration correction quantity is changed. Here, "the quantity of a change in the spherical aberration correction quantity" (hereinafter simply referred to as "correction change quantity") is indicative of a difference between the correction quantity A before the change and the correction quantity B as an intended value as a result of the change).

Generally, the correction change quantity can be set to a difference between an adequate correction quantity for the first layer and an adequate correction quantity for the second layer. In other words, the correction quantity B preferably is set to the adequate correction quantity for the second layer.

Figure 17:
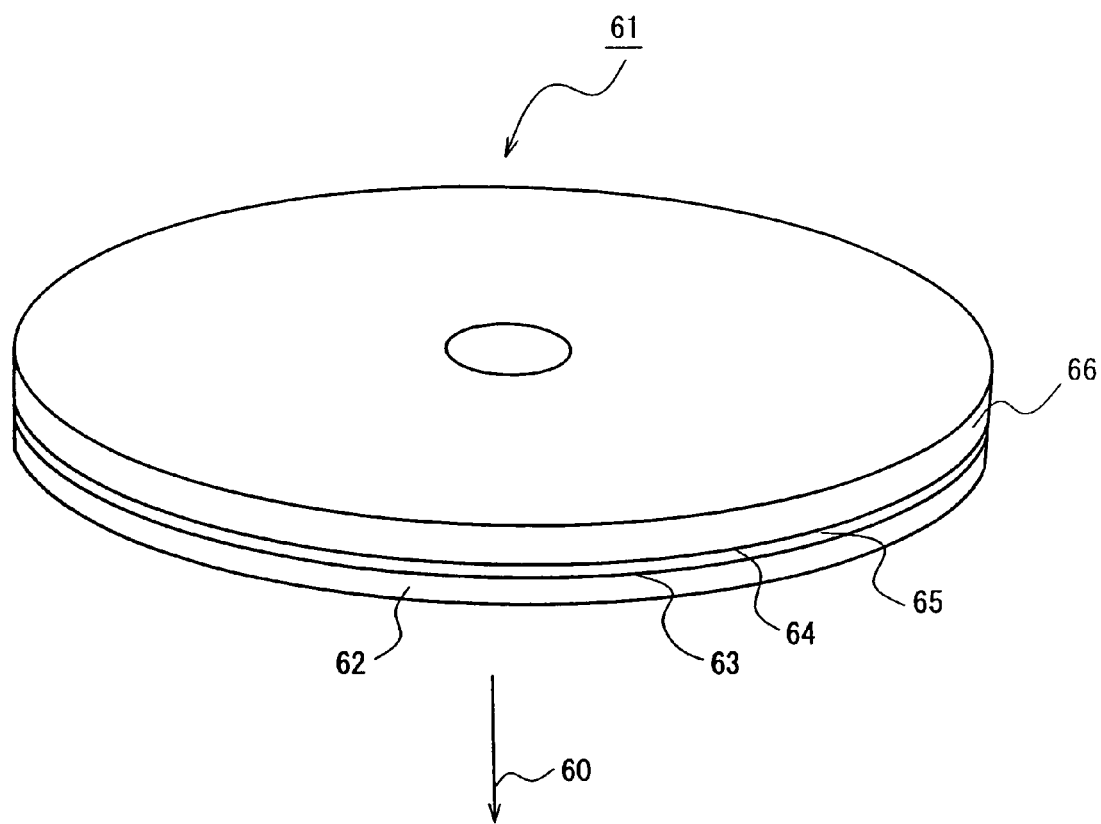
FIG. 17 is a schematic perspective view of a multi-layer optical disk having two recording layers.
Figure 18:
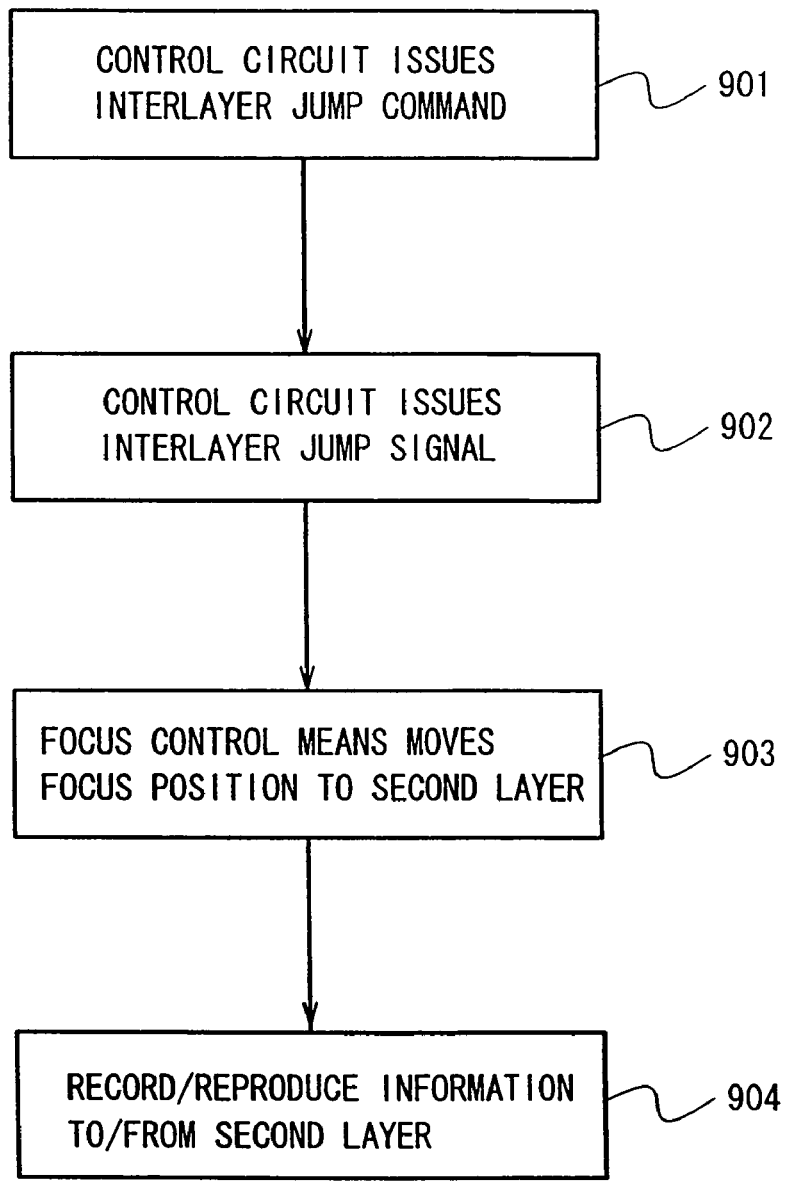
FIG. 18 is a flowchart illustrating a procedure of a focus position moving operation upon an interlayer jump operation in a conventional optical disk device.
Figure 19:
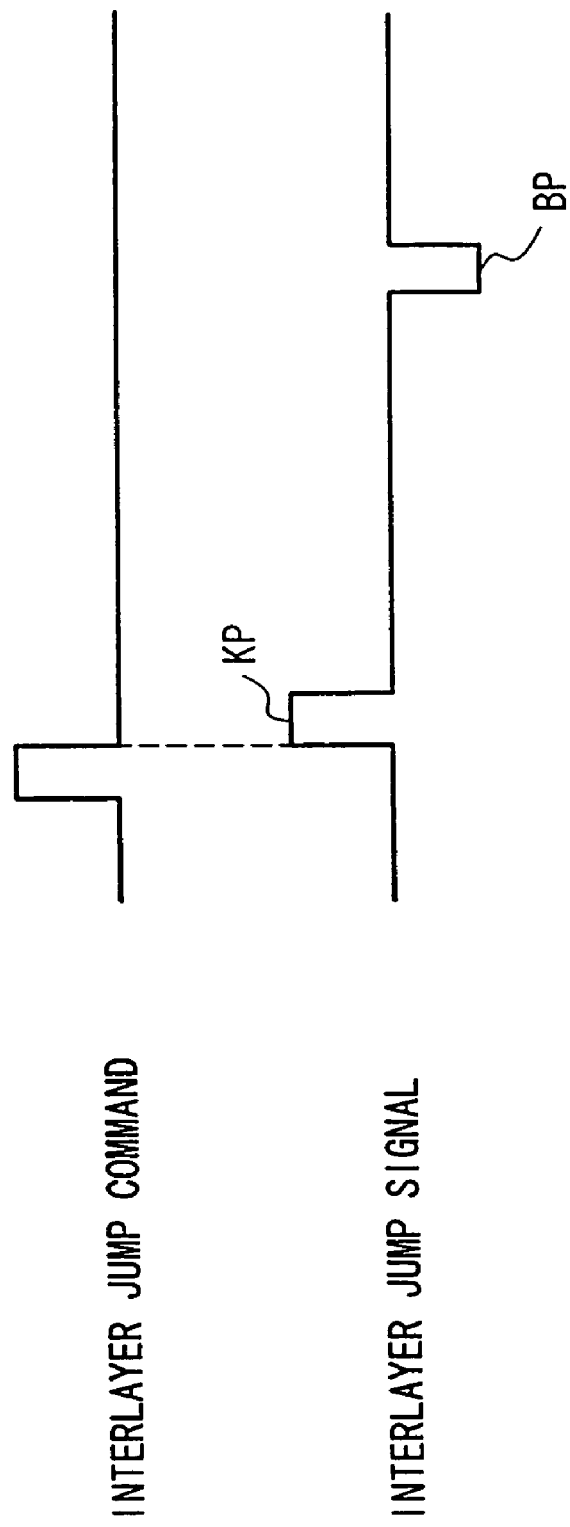
FIG. 19 is a timing chart illustrating variations of respective signals upon an interlayer jump operation in the conventional optical disk device.

For instance, the correction change quantity can be determined according to a standard thickness of the intermediate layer (the intermediate layer 65 shown in FIG. 17). In the case of a two-layer disk, the correction change quantity can be determined according to a standard thickness of the intermediate layer (thickness between two layers), which is prescribed by the standards. Alternatively, the focus control may be performed with respect to each layer upon loading an optical disk in the optical disk device or turning the optical disk device on so that a spherical aberration correction quantity that allows information signals to be obtained in the best state is learned for each layer, and a difference between the obtained spherical aberration correction quantities for the respective layers may be set as the correction change quantity. Preferably, the correction change quantity temporarily is determined according to a standard thickness of the intermediate layer, and the focus control is performed with respect to each layer upon loading an optical disk in the optical disk device or turning the optical disk device on so that a spherical aberration correction quantity that allows information signals to be obtained in the best state is learned for each layer, then, the temporarily determined correction change quantity is corrected according to a difference between the obtained spherical aberration correction quantities for the respective layers. In the above, the learning of the spherical aberration correction quantity preferably is carried out with respect to all recording layers of the multi-layer disk, but it may be carried out with respect to not all the layers, but one, two, or more specific layers.

Thus, by previously obtaining a correction change quantity necessary for an interlayer jump by leaning, an effect of obtainment of a more stable interlayer jump can be achieved. By determining the correction change quantity according to a standard thickness of the intermediate layer, it is possible to omit or reduce the learning time. Therefore, an effect of reduction of a preparation time following the loading of an optical disk or the turning on of the optical disk device can be achieved.

Since the correction change quantity is determined according to a standard thickness of the intermediate layer or according to a difference between the optimal correction quantities of respective layers obtained by learning (in other words, the correction quantity B is set to an adequate correction quantity for the second layer), the spherical aberration correction quantity when the change of the spherical aberration correction quantity is completed is set to the correction quantity adequate for the second layer as the destination. Therefore, the focus control with respect to the second layer is stabilized, and the recording/reproduction with respect to the second layer can be started immediately after an interlayer jump thereto.

On the other hand, the correction change quantity may be set smaller than the difference between the adequate correction quantity for the first layer and the adequate correction quantity for the second layer. In other words, the correction quantity B may be set to a value between the adequate correction quantity for the first layer and the adequate correction quantity for the second layer.

For instance, the correction change quantity may be set according to approximately half of a standard thickness of the intermediate layer between the first and second layers. Alternatively, the focus control is performed with respect to each layer upon loading an optical disk in the optical disk device or turning the optical disk device on so that a spherical aberration correction quantity that allows information signals to be obtained in the best state is learned for each layer, and a value of approximately half of a standard thickness of the intermediate layer may be used as the foregoing correction change quantity. Still alternatively, the correction change quantity is determined temporarily according to approximately half of a standard thickness of the intermediate layer, and thereafter, adequate spherical aberration correction quantities for the respective layers are determined by learning, so that the correction change quantity temporarily determined may be corrected according to approximately half of a difference between the obtained spherical aberration correction quantities for the respective layers.

Thus, by setting the correction change quantity to be smaller than a difference between the adequate correction quantity for the first layer and the adequate correction quantity for the second layer, the following effect can be achieved: the stability of the focus control with respect to the first layer before an interlayer jump can be secured. As described in conjunction with the second embodiment, particularly in the case where the change of the spherical aberration correction quantity is started before the moving of the focus position, the focus control with respect to the first layer possibly is made unstable after the change of the spherical aberration correction quantity is started and before the moving of the focus position is started. In such a case, by setting the correction change quantity to be smaller as described above, a remarkable effect of the stabilization of the focus control with respect to the first layer and the prevention of the focus control error can be obtained.

It should be noted that, irrespective of which technique among those described above is used to set the correction change quantity, the spherical aberration correction quantity preferably is re-adjusted again after an interlayer jump with a change in the spherical aberration correction quantity, so that reproduction signals are obtained in the best state. By so doing, more stable recording/reproducing operations are realized.

Furthermore in the foregoing description, the jumping operation with respect to two layers is depicted as an example, but the present invention also is applicable to a multi-layer disk having not less than three recording layers.

Figure 9:
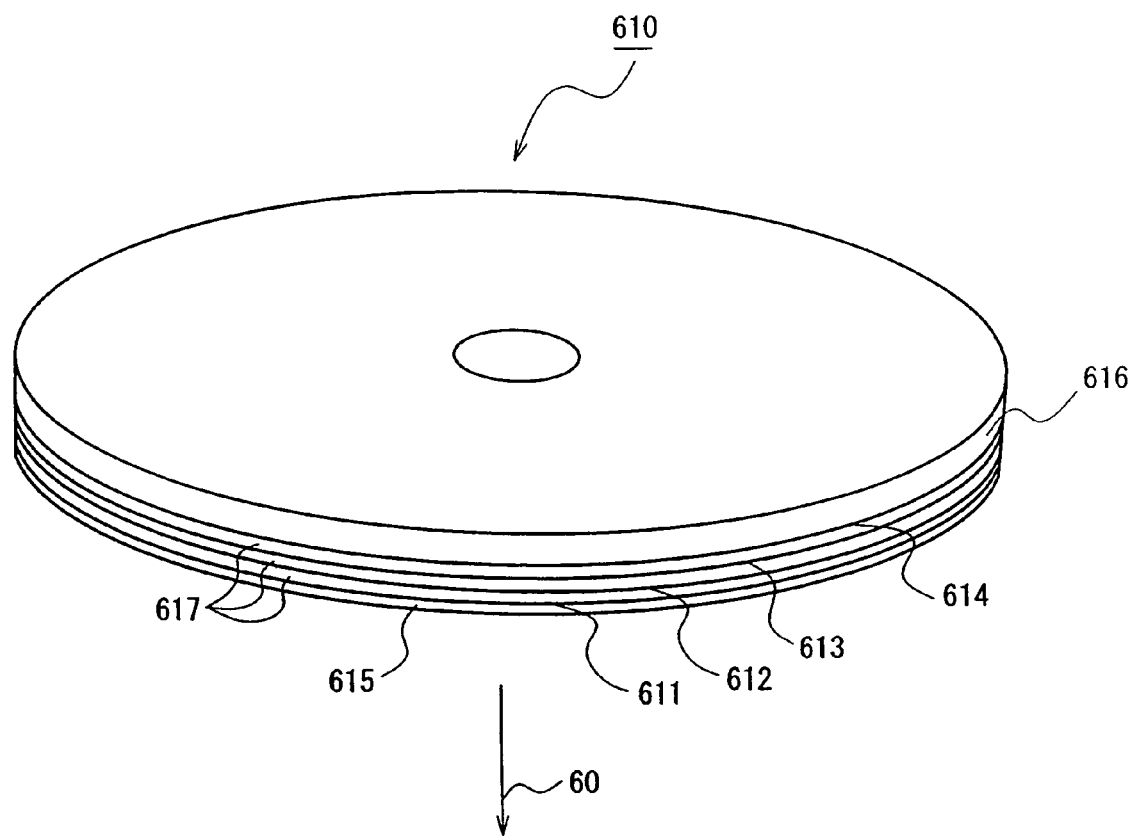
FIG. 9 is a schematic perspective view illustrating a multi-layer optical disk having four recording layers.

FIG. 9 illustrates an example of a multi-layer disk having four recording layers. The four-layer disk 610 includes, from the optical pickup 60 side, a substrate 615, an L1 layer (first recording layer) 611, an intermediate layer 617, an L2 layer (second recording layer) 612, an intermediate layer 617, an L3 layer (third recording layer) 613, an intermediate layer 617, an L4 layer (fourth recording layer) 614, and a reverse-side protective layer 616.

The number of layers of a multi-layer disk is not limited to two or four, and the present invention is effective and applicable for any number of layers not less than two. In the case of the four-layer disk shown in FIG. 9, the first layer as a starting point of a jump and the second layer as a destination of the jump in the foregoing description can be assumed to be any ones of the L1 layer to the L4 layer, respectively. For instance, the present invention is applicable to, not only the case where the focus position is moved to an adjacent layer like from the L1 layer to the L2 layer, but also the case where it is moved from the L2 layer to L4 layer, or the case where it is moved from the L4 layer to the L1 layer.

Fourth Embodiment

The following description will depict an embodiment of a computer that is equipped with the optical disk device according to any one of the first through third embodiments, or that uses the recording/reproducing method according to any one of the first through third embodiments.

Figure 10:
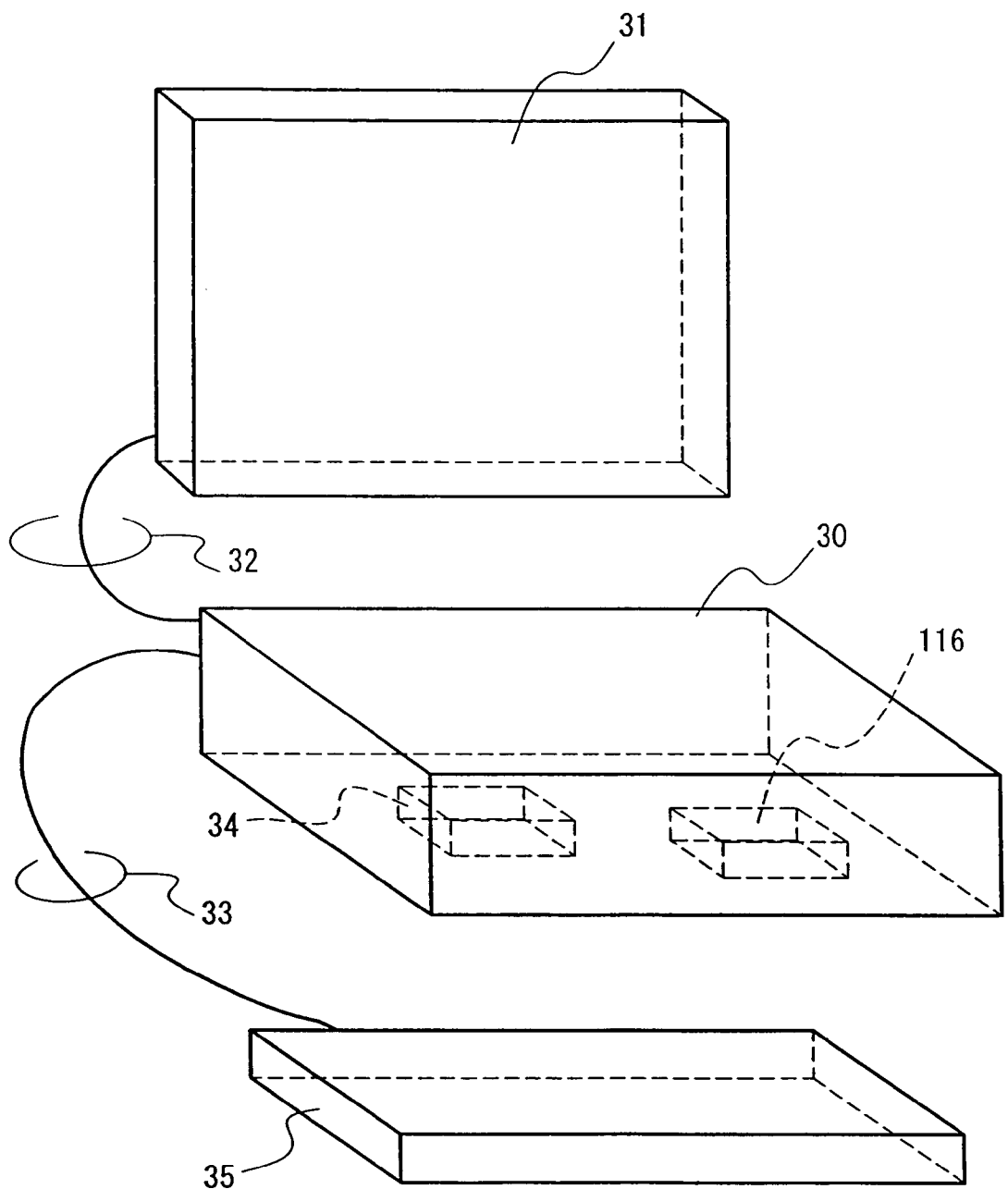
FIG. 10 is a view illustrating a schematic configuration of a computer according to a fourth embodiment of the present invention.

FIG. 10 is a view illustrating a schematic configuration of a computer 30 according to the present embodiment. In FIG. 10, 116 denotes an optical disk device according to any one of the first to third embodiments, 35 denotes an input device (for instance, a key board, a mouse, or a touch panel) for inputting information, 34 denotes a computing device including a central processing unit (CPU) that performs computation based on information inputted through the input device 35, information read out of the optical disk device 116, etc., 31 denotes an output device (for instance, a cathode-ray tube, a liquid crystal display device, or a printer) that displays information such as a result of the computation carried out by the computing device 34.

It should be noted that 33 denotes an input terminal connecting the computer 30 and the input device 35, and 32 denotes an output terminal connecting the computer 30 and the output device 31.

The computer 30 according to the present embodiment thus comprises the aforementioned optical disk device according to the present invention or uses the aforementioned recording/reproducing method according to the present invention. Therefore, it is capable of performing an interlayer jump stably and speedily with respect to a multi-layer disk. Consequently, an effect of allowing information recording/reproduction to be performed stably and speedily can be achieved.

Fifth Embodiment

The following description will depict an embodiment of an optical disk player that is equipped with the optical disk device according to any one of the first through third embodiments, or that uses the recording/reproducing method according to any one of the first through third embodiments.

FIG. 11 is a view illustrating a schematic configuration of an optical disk player 37 according to the present embodiment. In FIG. 11, 116 denotes an optical disk device according to any one of the first to third embodiments, 36 denotes an information-image converting device (for instance, a decoder) for converting information signals obtained from the optical disk device 116 into images, 31 denotes an output device (for instance, a cathode-ray tube, a liquid crystal display device, or a printer) for displaying image information converted by the converting device 36.

It should be noted that 33 denotes an input terminal provided to the optical disk player 37, and 32 denotes an output terminal connecting the optical disk player 37 and the output device 31.

The optical disk player 37 according to the present embodiment thus comprises the aforementioned optical disk device according to the present invention or uses the aforementioned recording/reproducing method according to the present invention. Therefore, it is capable of performing an interlayer jump stably and speedily with respect to a multi-layer disk. Consequently, an effect of allowing information recording/reproduction to be performed stably and speedily can be achieved.

Sixth Embodiment

The following description will depict an embodiment of an optical disk recorder that is equipped with the optical disk device according to any one of the first through third embodiments, or that uses the recording/reproducing method according to any one of the first through third embodiments.

Figure 12:
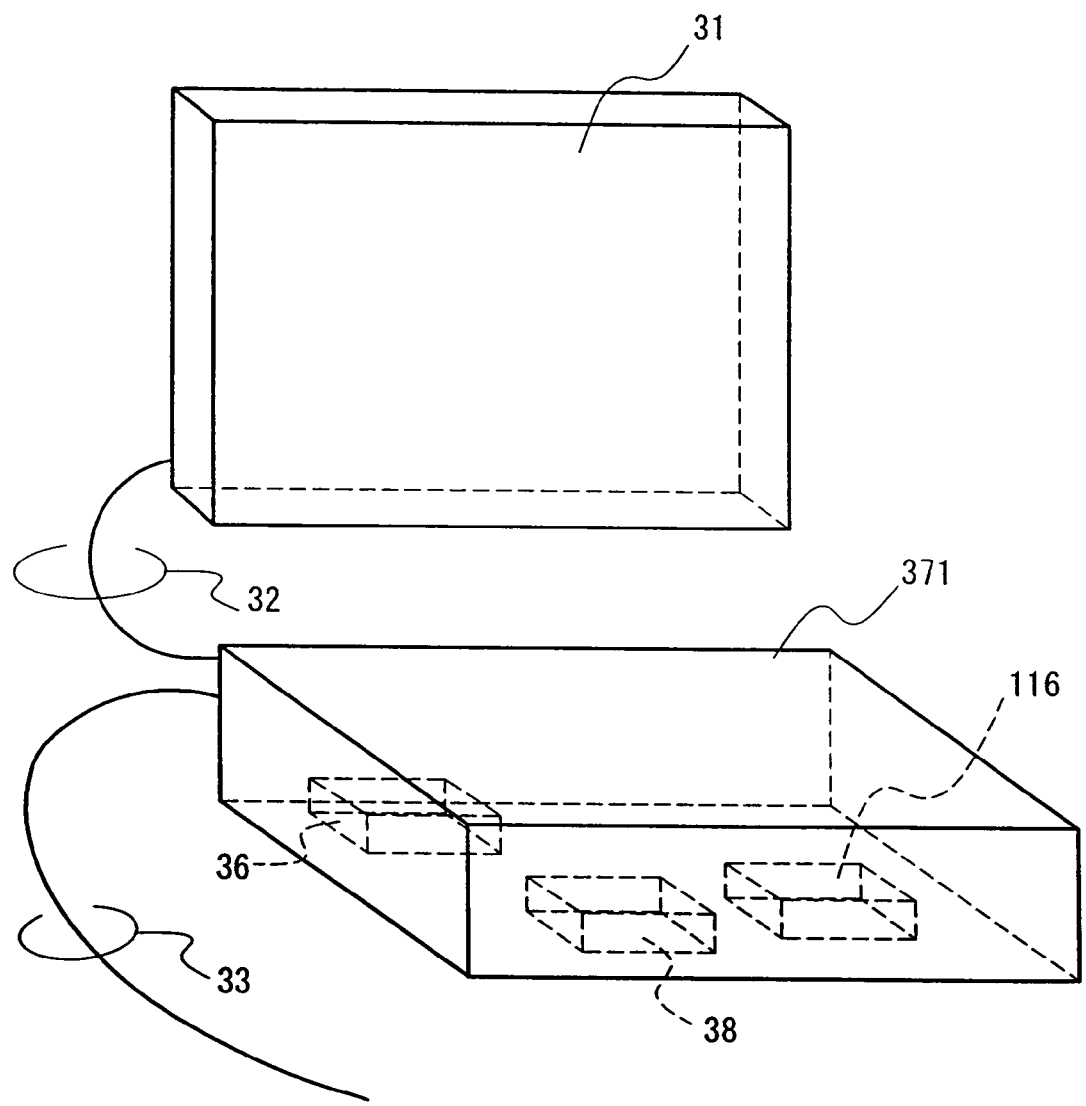
FIG. 12 is a view illustrating a schematic configuration of an optical disk recorder according to a sixth embodiment of the present invention.

FIG. 12 is a view illustrating a schematic configuration of an optical disk recorder 371 according to the present embodiment. In FIG. 12, 116 denotes an optical disk device according to any one of the first to third embodiments, and 38 denotes an image-information converting device (for instance, an encoder) for converting image information into information that the optical disk device 116 can record.

The optical disk recorder 371 desirably further includes an information-image converting device (for instance, a decoder) 36 for converting information signals obtained from the optical disk device 116 into images, so as to be capable of performing the simultaneous monitoring upon recording, reproducing information already recorded, and the like. Furthermore, 31 denotes an output device (for instance, a cathode-ray tube, a liquid crystal display device, or a printer) for displaying image information converted by the converting device 36.

It should be noted that 33 denotes an input terminal provided to the optical disk recorder 371, and 32 denotes an output terminal connecting the optical disk recorder 371 and the output device 31.

The optical disk recorder 371 according to the present embodiment thus comprises the aforementioned optical disk device according to the present invention or uses the aforementioned recording/reproducing method according to the present invention. Therefore, it is capable of performing an interlayer jump stably and speedily with respect to a multi-layer disk. Consequently, an effect of allowing information recording/reproduction to be performed stably and speedily can be achieved.

Seventh Embodiment

Figure 13:
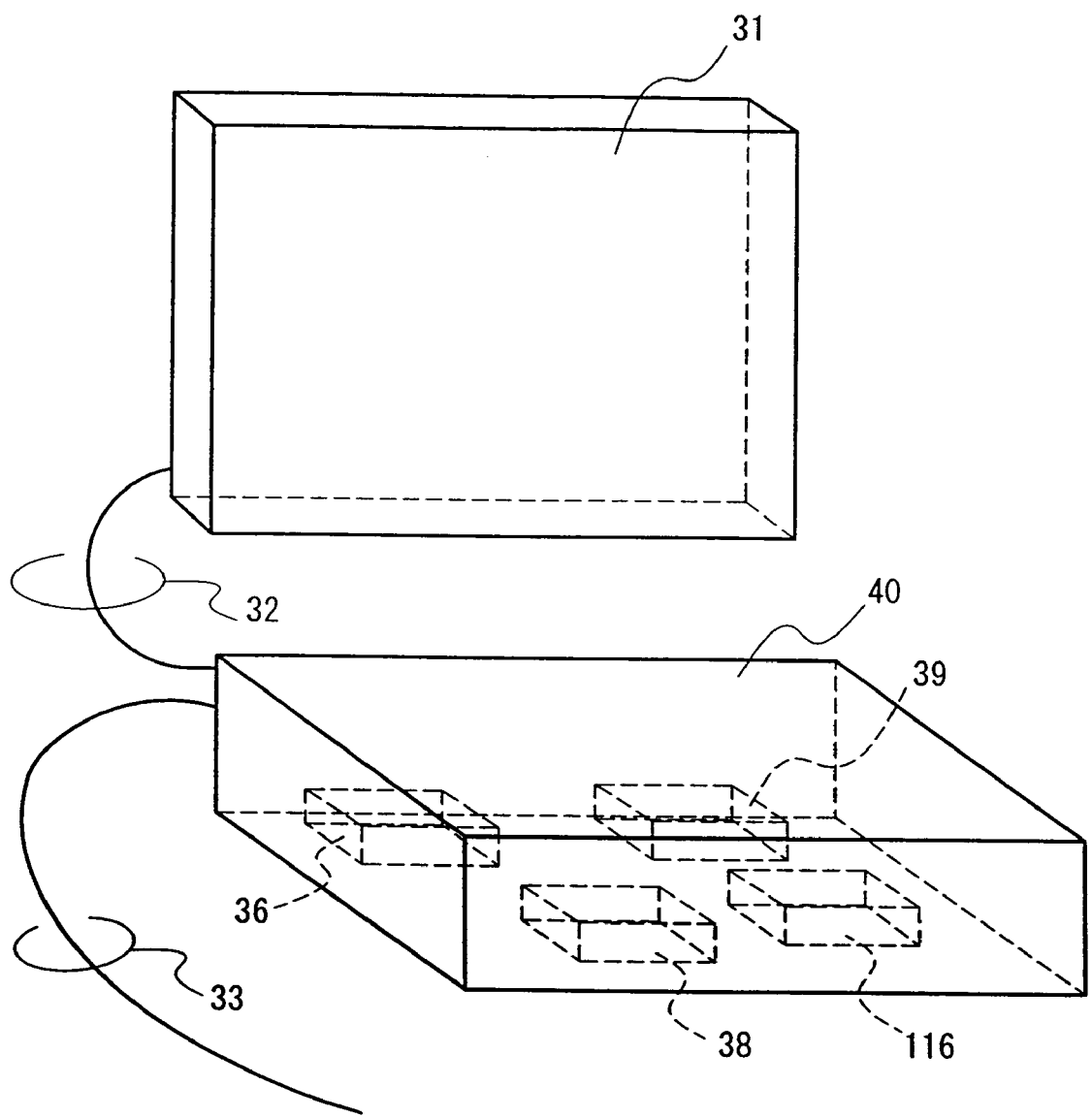
FIG. 13 is a view illustrating a schematic configuration of an optical disk server according to a seventh embodiment of the present invention.

The following description will depict an optical disk server 40 according to a seventh embodiment while referring to FIG. 13. In FIG. 13, an optical disk device 116 is an optical disk device according to any one of the first through third embodiments. A wireless input/output terminal 39 is a wireless receiving/transmitting device that captures information to be recorded optical disk from the optical disk device 116 and outputs information read out of an optical disk by using the optical disk device 116 to the outside. By causing the optical disk server 40 to communicate information with a plurality of devices having wireless receiving/transmitting terminals, for instance, computers, telephones, and TV tuners via such a wireless input/output terminal 39, it is possible to utilize the optical disk server 40 as an information server (optical disk server) common to these plural devices.

It should be noted that 36 denotes an information-image converting device (for instance, a decoder) for converting information signals obtained from the optical disk device 116 into images, and 31 denotes an output device (for instance, a cathode-ray tube, a liquid crystal display device, or a printer) for displaying image information converted by the converting device 36. Further, 38 denotes an image-information converting device (for instance, an encoder) for converting image information into information that the optical disk device 116 can record.

It should be noted that 33 denotes an input terminal provided to the optical disk server 40, and 32 denotes an output terminal connecting the optical disk server 40 and the output device 31.

The optical disk server 40 according to the present embodiment thus comprises the aforementioned optical disk device according to the present invention or uses the aforementioned recording/reproducing method according to the present invention. Therefore, it is capable of performing an interlayer jump stably and speedily with respect to a multi-layer disk. Consequently, an effect of allowing information recording/reproduction to be performed stably and speedily can be achieved.

It should be noted that the foregoing description depicts a case where the optical disk device 116 is an optical disk device according to any one of the first to third embodiments, but the optical disk device 116 in the present embodiment is not limited to this. Apart from an optical disk device according to the present invention, any known optical disk device may be used. By combining the optical disk device and the wireless input/output terminal 39, the following effect is achieved: the optical disk server 40 can be utilized as a common server for a plurality of devices without wiring.

Though the output terminal 32 is connected with the output device 31 in FIGS. 10 to 13 illustrating the fourth to seventh embodiments, a configuration in which the output terminal 32 is provided but not connected with an output device 31 is feasible as a commercial commodity product. Likewise, though the input terminal 33 is connected with the input device 35 in FIG. 10 illustrating the fourth embodiment, a configuration in which the input terminal 33 is provided but not connected with an input device 35 is feasible as a commercial commodity product. Furthermore, though only the input terminal 33 is shown and an input device is not shown in FIGS. 11 to 13 illustrating the fifth to seventh embodiments, a configuration in which a known input device such as a key board, a touch panel, or a mouse is connected with the input terminal 33 is feasible as a commercial commodity product.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disk device for performing information recording or reproduction with respect to an optical disk, comprising:

an optical pickup including a laser light source, a convergent optical system having an objective lens that receives a light beam emitted from the laser light source and converges a microspot on an optical disk, and an aberration correcting optical system that controls a spherical aberration of the convergent optical system, wherein the aberration correcting optical system starts an operation of setting a correction quantity of the spherical aberration to a value adequate for recording or reproduction with respect to a recording layer of the optical disk before a focus control for focusing a focus position of the microspot on the recording layer is completed.

2. The optical disk device according to claim 1, wherein moving the focus position of the microspot to the recording layer is started after the operation of setting the correction quantity of the spherical aberration is completed.

3. The optical disk device according to claim 1, wherein the optical disk is a multi-layer optical disk having a plurality of recording layers.

4. An information recording or reproducing method for performing information recording or reproduction with respect to an optical disk by utilizing an optical disk device, the optical disk device including:

an optical pickup including a laser light source, a convergent optical system having an objective lens that receives a light beam emitted from the laser light source, and converges a microspot on an optical disk, and an aberration correcting optical system that controls a spherical aberration of the convergent optical system, the information recording or reproducing method comprising the steps of:

setting a correction quantity of the spherical aberration to a value adequate for recording or reproduction with respect to a recording layer; and performing a focus control for focusing a focus position of the microspot on a recording layer of the optical disk, the correction quantity setting step being started by the aberration correcting optical system before the focus control performing step is completed.

5. The information recording/reproducing method according to claim 4, wherein moving the focus position of the microspot to the recording layer is started after the correction quantity setting step is completed.

6. The information recording/reproducing method according to claim 4, wherein the optical disk is a multi-layer optical disk having a plurality of recording layers.

7. A computer comprising:
the optical disk device according to claim 1;
an input device or an input terminal for inputting information;
a computing device that performs a computation based on at least one of information inputted through the input device or the input terminal and information reproduced from the optical disk device; and
an output device or an output terminal for displaying or outputting at least one of information inputted through the input device or the input terminal, information reproduced from the optical disk device, and a result of a computation of the computing device.

8. An optical disk player comprising:
the optical disk device according to claim 1; and
an information-image converting device for converting information signals obtained from the optical disk device into images.

9. An optical disk recorder comprising:
the optical disk device according to claim 1; and
an image-information converting device for converting image information into information signals that can be recorded by means of the optical disk device.

10. An optical disk server comprising:
the optical disk device according to claim 1; and
a wireless input/output terminal.

11. An information recording or reproducing method for performing information recording or reproduction with respect to an optical disk by utilizing an optical disk device, the optical disk device including:
an optical pickup including a laser light source, a convergent optical system having an objective lens that receives a light beam emitted from the laser light source, and converges a microspot on an optical disk, and an aberration correcting optical system that controls a spherical aberration of the convergent optical system,
the information recording or reproducing method comprising the step of:
setting a correction quantity of the spherical aberration to a value adequate for recording or reproduction with respect to a recording layer,
the correction quantity setting step being started by the aberration correcting optical system before performing a focus control for focusing a focus position of the microspot on the recording layer of the optical disk is completed.

12. An information recording or reproducing method for performing information recording or reproduction with respect to an optical disk by utilizing an optical disk device, the optical disk device including:
an optical pickup including a laser light source, a convergent optical system having an objective lens that receives a light beam emitted from the laser light source, and converges a microspot on an optical disk, and an aberration correcting optical system that controls a spherical aberration of the convergent optical system,
the information recording or reproducing method comprising the step of:
performing a focus control for focusing a focus position of the microspot on a recording layer of the optical disk,
the focus control performing step being completed after setting a correction quantity of the spherical aberration to a value adequate for recording or reproduction with respect to the recording layer is started by the aberration correcting optical system.

13. An optical head that performs light irradiation with respect to an optical recording medium having a plurality of information recording layers, each of which is coated with a light transmitting protective layer, in which light converged by an objective lens is irradiated selectively onto the plurality of information recording layers, the optical head comprising:
a spherical aberration correcting part that corrects a spherical aberration generated due to a difference in transmission thickness of the light transmitting protective layer in which the light is transmitted through the light transmitting protective layer when the light is irradiated selectively onto the plurality of information recording layers,
wherein when the light converged by the objective lens is irradiated selectively onto the plurality of information recording layers, the spherical aberration correcting part has been adjusted so that a spherical aberration correction state obtained by the spherical aberration correcting part is optimal with respect to a transmission thickness of the light transmitting protective layer corresponding to a predetermined information recording layer among the plurality of information recording layers.

* * * * *